(12) United States Patent
Matsumura

(10) Patent No.: US 10,965,896 B2
(45) Date of Patent: Mar. 30, 2021

(54) PHOTOELECTRIC CONVERSION DEVICE, MOVING BODY, AND SIGNAL PROCESSING DEVICE

(71) Applicant: CANON KABUSHIKI KAISHA, Tokyo (JP)

(72) Inventor: Koichi Matsumura, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/687,528

(22) Filed: Nov. 18, 2019

(65) Prior Publication Data

US 2020/0169679 A1    May 28, 2020

(30) Foreign Application Priority Data

Nov. 28, 2018   (JP) .............................. JP2018-222799

(51) Int. Cl.
*H04N 5/369*   (2011.01)
*H04N 5/341*   (2011.01)
*H04N 5/378*   (2011.01)
*H04N 5/232*   (2006.01)
(Continued)

(52) U.S. Cl.
CPC ......... *H04N 5/36961* (2018.08); *H04N 5/341* (2013.01); *H04N 5/378* (2013.01); *H04N 5/379* (2018.08); *H04N 5/232122* (2018.08); *H04N 5/36963* (2018.08)

(58) Field of Classification Search
CPC .... H04N 5/36961; H04N 5/379; H04N 5/341; H04N 5/378; H04N 5/232122; H04N 5/36963; H04N 5/3651; H04N 5/37457; H04N 5/3696; H04N 5/36965; H04N 5/361; H04N 5/343; H04N 5/345; H04N 5/3452;
(Continued)

(56) References Cited

U.S. PATENT DOCUMENTS

2006/0133792 A1* 6/2006 Ide ......................... G03B 13/32
396/111
2008/0074534 A1* 3/2008 Kusaka .............. H04N 5/23212
348/364
(Continued)

FOREIGN PATENT DOCUMENTS

JP    2013-211833 A    10/2013
JP    2018-148295 A    9/2018

*Primary Examiner* — Albert H Cutler
(74) *Attorney, Agent, or Firm* — Canon U.S.A., Inc. IP Division

(57) ABSTRACT

A photoelectric conversion device includes a pixel array, a memory configured to be input a signal output from the pixel array, and an arithmetic operation processing circuit configured to input the signal output from the memory and perform arithmetic operation processing using the signal. The photoelectric conversion device includes a first pixel including a plurality of photoelectric conversion portions shielded from light, and a second pixel and a third pixel each including the plurality of photoelectric conversion portions on which the light is incident. The pixel array outputs a first signal, a second signal, and a third signal in this order. The first signal, the second signal, and the third signal output from the memory are input to the arithmetic operation processing circuit in the order of the first signal, the third signal, and the second signal.

20 Claims, 13 Drawing Sheets

(51) Int. Cl.
*H04N 5/365* (2011.01)
*H04N 5/3745* (2011.01)

(58) Field of Classification Search
CPC .... H04N 5/3454; H04N 5/3456; H04N 5/347;
H04N 5/23212; H04N 5/232127
See application file for complete search history.

(56) References Cited

U.S. PATENT DOCUMENTS

| | | | |
|---|---|---|---|
| 2015/0312485 A1* | 10/2015 | Kitani | H04N 5/232122 |
| | | | 348/221.1 |
| 2015/0373251 A1 | 12/2015 | Haneda | |
| 2016/0094778 A1* | 3/2016 | Okubo | H04N 5/232122 |
| | | | 348/349 |
| 2016/0360136 A1* | 12/2016 | Katagawa | H04N 19/124 |
| 2017/0171477 A1* | 6/2017 | Hirose | H04N 5/232122 |
| 2017/0230569 A1 | 8/2017 | Sambonsugi | |
| 2018/0024313 A1* | 1/2018 | Uchida | H04N 5/37457 |
| | | | 382/255 |
| 2018/0220058 A1* | 8/2018 | Takahashi | H04N 5/23212 |
| 2018/0295269 A1* | 10/2018 | Sakaguchi | H04N 5/3532 |

* cited by examiner

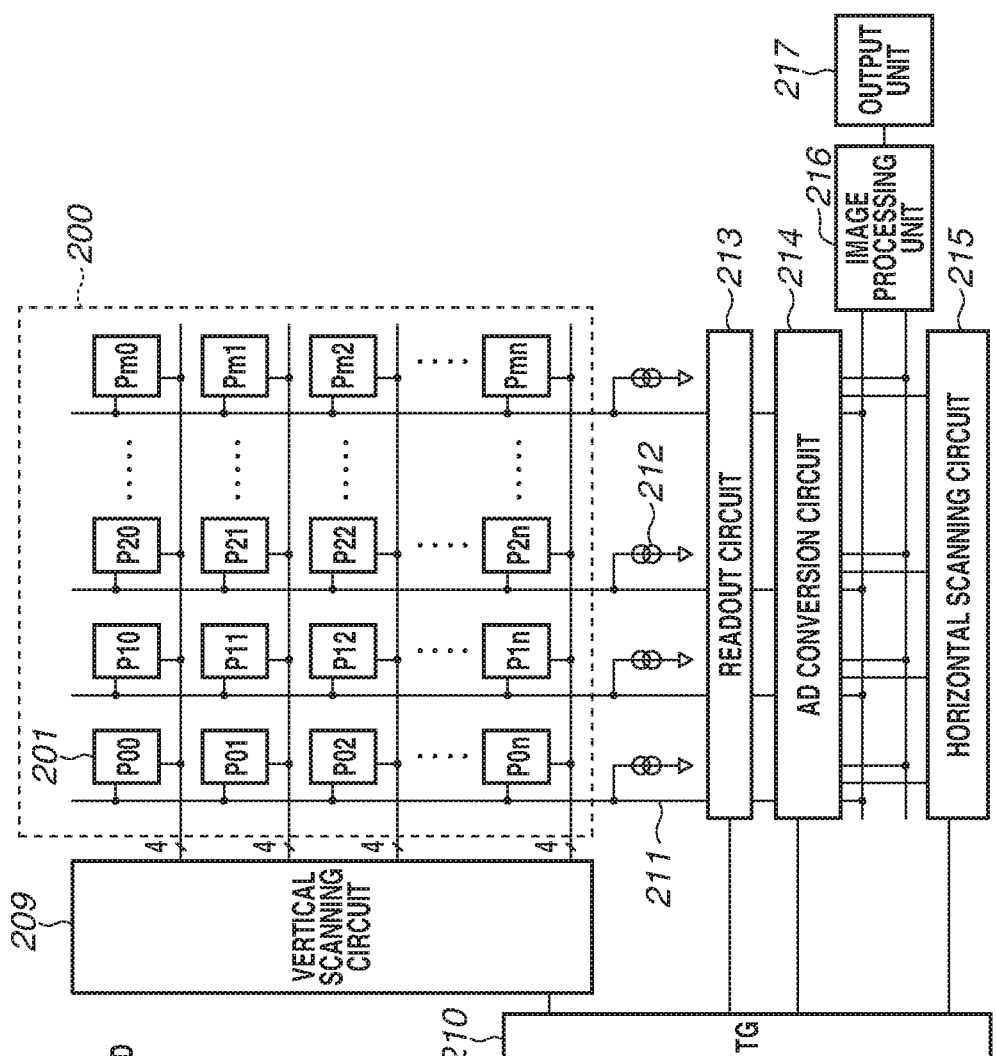
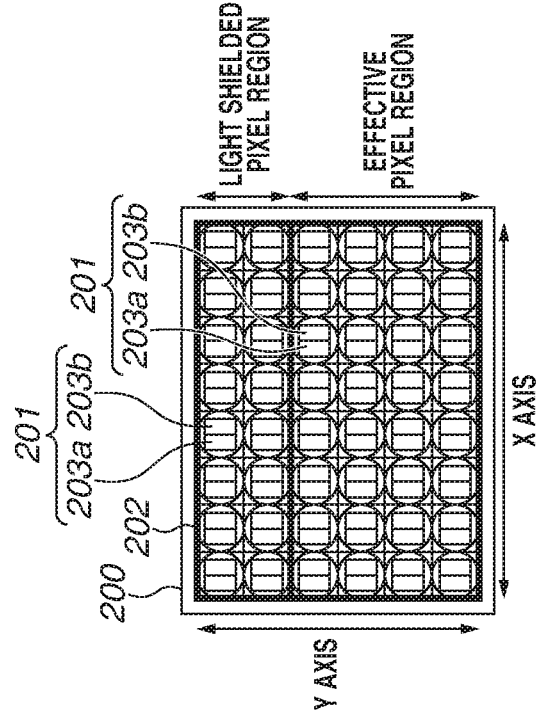
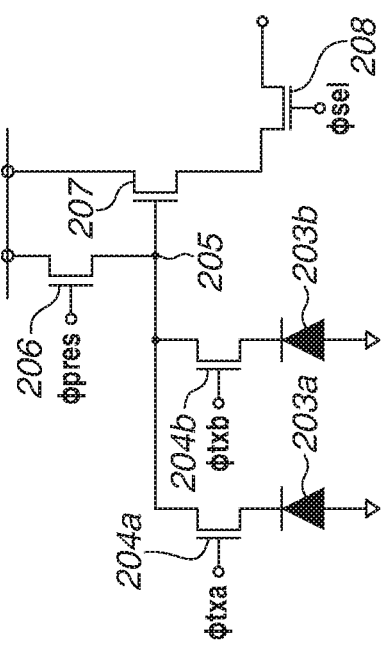

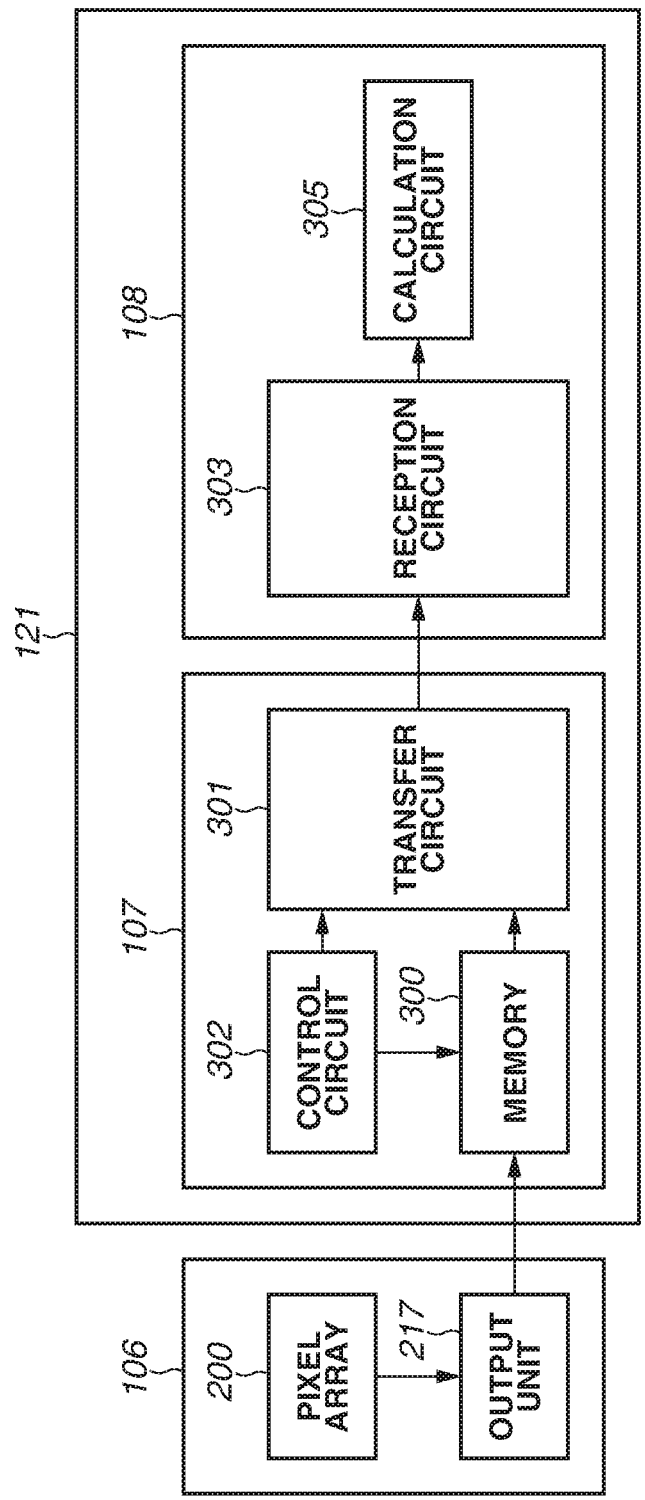

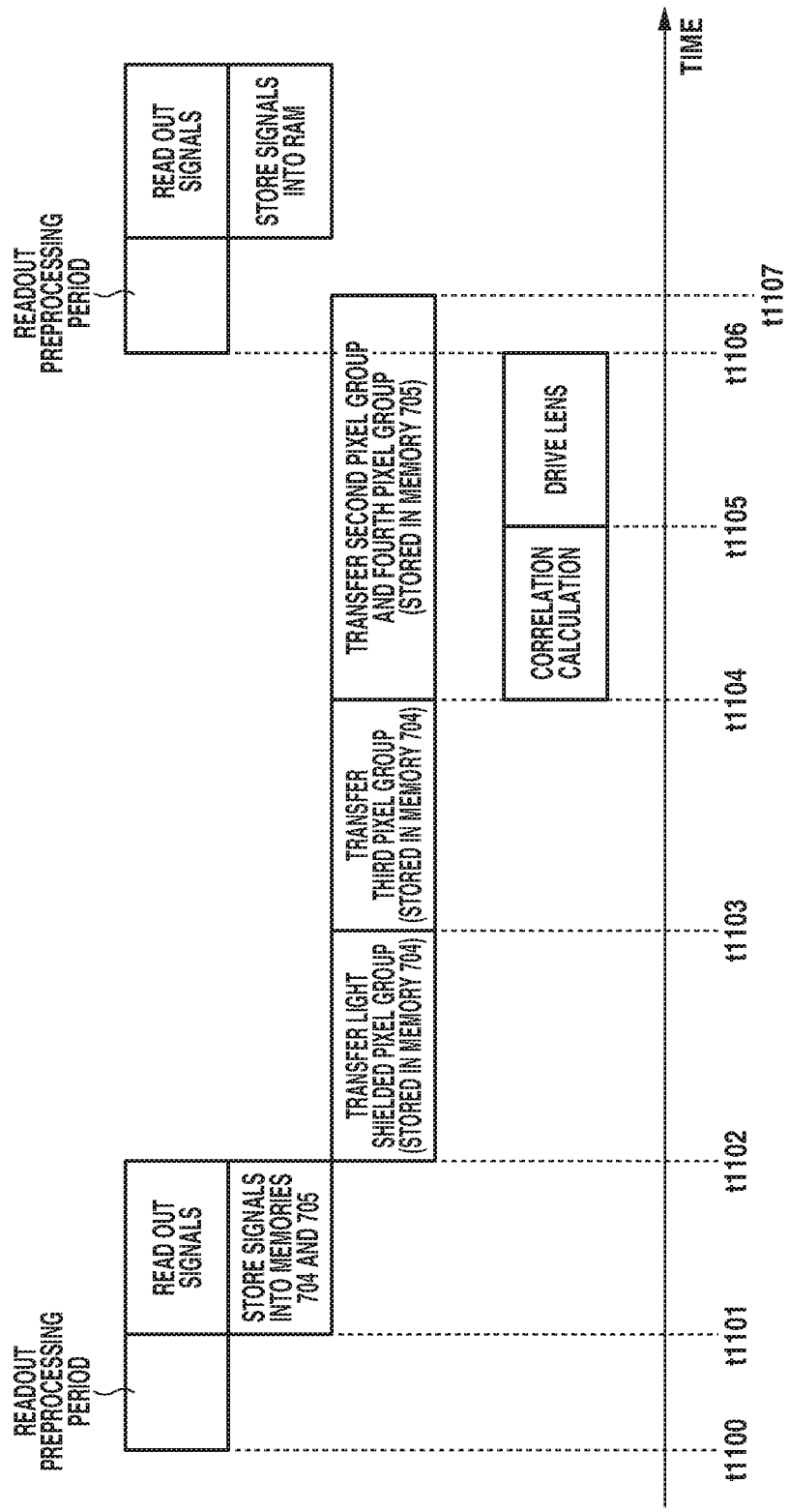

PHOTOELECTRIC CONVERSION DEVICE, MOVING BODY, AND SIGNAL PROCESSING DEVICE

BACKGROUND

Field

The present disclosure relates to a photoelectric conversion device, a moving body, and a signal processing device.

Description of the Related Art

An imaging device is known that carries out phase difference detection using signals based on electric charges generated in a plurality of photoelectric conversion portions. Japanese Patent Application Laid-Open No. 2013-211833 discusses an imaging device having a plurality of pixels each including the plurality of photoelectric conversion portions. Each of the pixels outputs the signals based on the electric charges generated in the plurality of photoelectric conversion portions. Japanese Patent Application Laid-Open No. 2013-211833 further discusses a configuration in which a part of the plurality of pixels outputs a signal based on electric charges generated in a part of the photoelectric conversion portions of each of the pixels.

However, Japanese Patent Application Laid-Open No. 2013-211833 fails to discuss an order in which the signals read out from the plurality of pixels are input to an arithmetic operation circuit that performs arithmetic operation processing, in an imaging device that further has a pixel having photoelectric conversion portions shielded from light (hereinafter referred to as a "light shielded pixel").

SUMMARY

The present disclosure provides a suitable order of inputting signals read out from a plurality of pixels including a light shielded pixel to an arithmetic operation circuit.

According to an aspect of the present disclosure, a photoelectric conversion device includes a pixel array, a memory, and an arithmetic operation processing circuit. The pixel array includes a plurality of pixels two-dimensionally laid out therein and each including a plurality of photoelectric conversion portions. The memory is configured to be input a signal output from the pixel array. The arithmetic operation processing circuit is configured to input the signal output from the memory and also perform arithmetic operation processing using this signal. The plurality of pixels includes a first pixel, a second pixel, and a third pixel. The first pixel includes the plurality of photoelectric conversion portions shielded from light. The second pixel and the third pixel each include the plurality of photoelectric conversion portions on which the light is incident. The pixel array outputs a first signal, a second signal, and a third signal in this order. The first signal is acquired based on electric charge generated in the plurality of photoelectric conversion portions included in the first pixel. The second signal is acquired based on electric charge generated in the plurality of photoelectric conversion portions included in the second pixel. The third signal includes a signal based on electric charge generated in one of the photoelectric conversion portions included in the third pixel, and a signal at least based on electric charge generated in another one of the photoelectric conversion portions. The first signal, the second signal, and the third signal are stored in the memory. The first signal, the second signal, and the third signal output from the memory are input to the arithmetic operation processing circuit in the order of the first signal, the third signal, and the second signal.

According to another aspect of the present disclosure, a photoelectric conversion device includes a pixel array including a first pixel, a second pixel, and a third pixel. The first pixel includes a plurality of photoelectric conversion portions shielded from light, and is configured to output a black reference signal generated in the plurality of photoelectric conversion portions. The second pixel includes a plurality of photoelectric conversion portions, and is configured to be used to generate a signal for an image. The third pixel includes a plurality of photoelectric conversion portions, and is configured to be used to generate the signal for the image and a signal for focus detection. The photoelectric conversion device further includes a memory configured to be input a signal output from the pixel array, and an arithmetic operation processing circuit configured to be input the signal output from the memory and perform arithmetic operation processing using this signal. The pixel array outputs a first signal, a second signal, and a third signal in this order. The first signal corresponds to the black reference signal output from the first pixel. The second signal corresponds to the signal for the image that is output from the second pixel. The third signal includes the signal for the image and the signal for the focus detection that are output from the third pixel. The first signal, the second signal, and the third signal are stored in the memory. The first signal, the second signal, and the third signal output from the memory are input to the arithmetic operation processing circuit in the order of the first signal, the third signal, and the second signal.

According to yet another aspect of the present disclosure, a signal processing device is configured to be input a signal from a pixel array including a plurality of pixels. The signal processing device includes a memory configured to be input the signal output from the pixel array, and an arithmetic operation processing circuit configured to be input the signal output from the memory and perform arithmetic operation processing using this signal. The plurality of pixels included in the pixel array includes a first pixel, a second pixel, and a third pixel. The first pixel includes a plurality of photoelectric conversion portions shielded from light. The second pixel and the third pixel each include a plurality of photoelectric conversion portions on which the light is incident. A first signal, a second signal, and a third signal are output from the pixel array in this order. The first signal is acquired based on electric charge generated in the plurality of photoelectric conversion portions included in the first pixel. The second signal is acquired based on electric charge generated in the plurality of photoelectric conversion portions included in the second pixel. The third signal includes a signal based on electric charge generated in one of the photoelectric conversion portions included in the third pixel and a signal at least based on electric charge generated in another one of the photoelectric conversion portions. The first signal, the second signal, and the third signal are stored in the memory. The first signal, the second signal, and the third signal output from the memory are input to the arithmetic operation processing circuit in the order of the first signal, the third signal, and the second signal.

According to yet another aspect of the present disclosure, a signal processing device is configured to be input a signal from a pixel array. The pixel array includes a first pixel, a second pixel, and a third pixel. The first pixel includes a plurality of photoelectric conversion portions shielded from light, and is configured to output a black reference signal generated in the plurality of photoelectric conversion portions. The second pixel includes a plurality of photoelectric conversion portions, and is configured to generate a signal for an image. The third pixel includes a plurality of photoelectric conversion portions, and is configured to generate the signal for the image and a signal for focus detection. The signal processing device includes a memory configured to be input the signal output from the pixel array, and an arithmetic operation processing circuit configured to be input a digital signal output from the memory and perform arithmetic operation processing. The pixel array outputs a first signal, a second signal, and a third signal in this order. The first signal corresponds to the black reference signal output from the first pixel. The second signal corresponds to the signal for the image that is output from the second pixel. The third signal includes the signal for the image and the signal for the focus detection that is output from the third pixel. The first signal, the second signal, and the third signal are stored in the memory. The first signal, the second signal, and the third signal output from the memory are input to the arithmetic operation processing circuit in the order of the first signal, the third signal, and the second signal.

Further features of the present disclosure will become apparent from the following description of exemplary embodiments with reference to the attached drawings.

BRIEF DESCRIPTION OF THE DRAWINGS

FIGS. 2A to 2C are diagrams illustrating configurations and a circuit of the photoelectric conversion device according to the first exemplary embodiment.

FIG. 3 is a block diagram illustrating a photoelectric conversion element and a signal processing circuit according to the first exemplary embodiment.

FIG. 12 is a timing chart illustrating an operation of the photoelectric conversion device according to the third exemplary embodiment.

DESCRIPTION OF THE EMBODIMENTS

Figure 1:
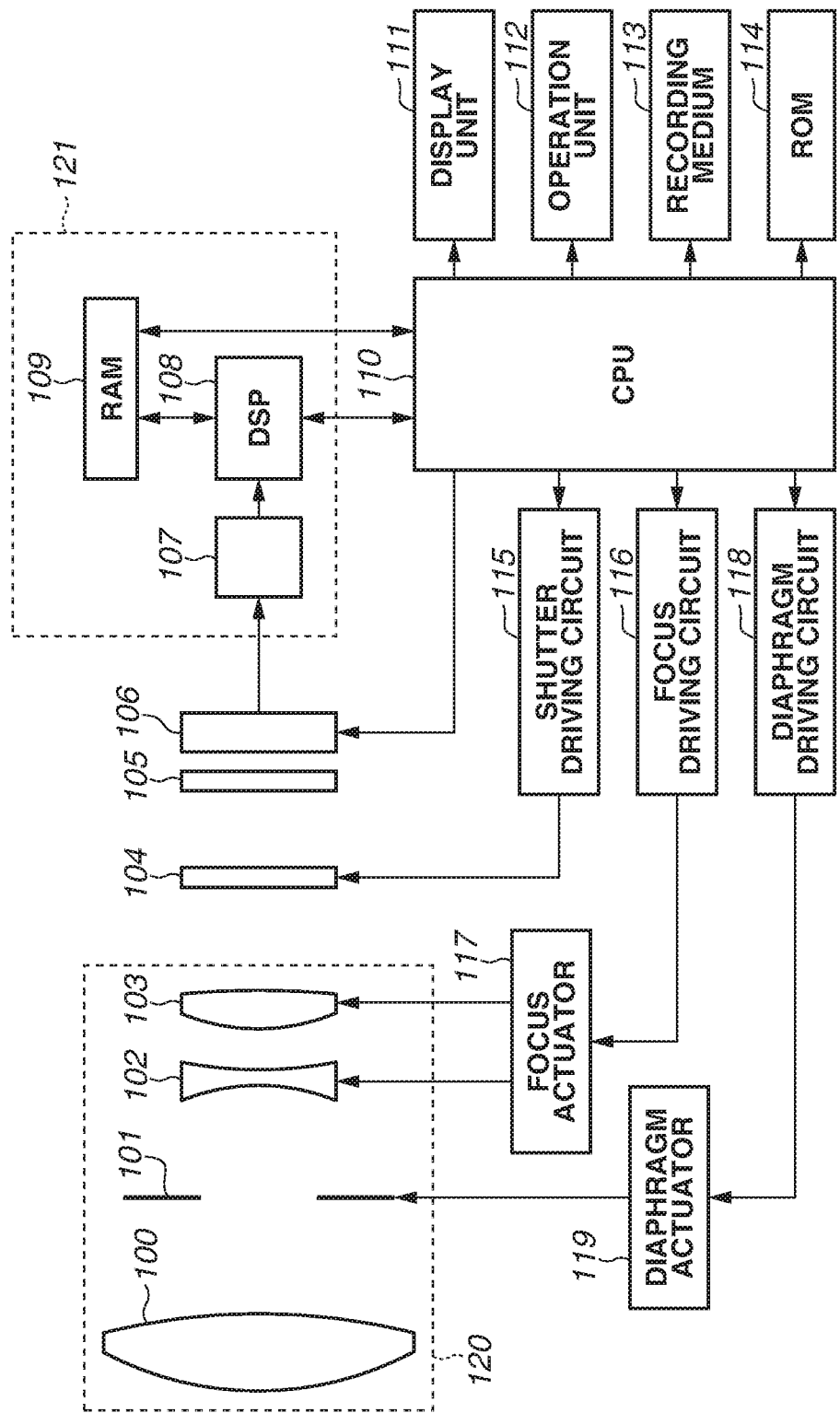
FIG. 1 is a block diagram illustrating a configuration of a photoelectric conversion device according to a first exemplary embodiment.

Exemplary embodiments for implementing the present disclosure will be described with reference to the following drawings. However, configurations indicated in the following exemplary embodiments are merely one example. The present disclosure shall not be limited to the illustrated configurations. Sizes, a positional relationship, and the like of members illustrated in each of the drawings may be exaggerated for the purpose of making the description clearly understandable.

In the exemplary embodiments described below, similar configurations may be identified by the same reference numerals and descriptions thereof may be omitted.

FIG. 1 illustrates a configuration of a photoelectric conversion device according to a first exemplary embodiment. FIG. 1 illustrates an imaging device as one example of the photoelectric conversion device. Examples of the imaging device include a digital still camera, a digital camcorder, a monitoring camera, a copying machine, a facsimile machine, a mobile phone, an in-vehicle camera, and an observatory satellite. The present disclosure is not limited to the imaging device. The photoelectric conversion device according to each of the exemplary embodiments described below can achieve effects even when it is applied to a device not intended to capture an image. Examples of the device not intended to capture an image include a distance measurement sensor, and a light measurement sensor. The distance measurement sensor is typically a sensor used to generate information about a distance to a subject, and examples thereof include a Time of Flight (TOF) sensor. The light measurement sensor is typically a sensor used to detect brightness of the subject.

In FIG. 1, a lens 100 is disposed at a distal end of an imaging optical system 120. A diaphragm 101 adjusts a light amount at the time of imaging by adjusting an aperture diameter thereof. A focus actuator 117 described below drives a lens 102 and a lens 103 to adjust focus of the imaging optical system 120 by moving the lenses backward and forward in an optical axis direction.

A focal-plane shutter 104 adjusts an exposure time at the time of imaging a still image. An optical low-pass filter 105 is used to reduce a false color and a moire in a captured image. A photoelectric conversion element 106 photoelectrically converts an optical image of the subject formed by the imaging optical system 120 into an electric signal. The electric signal output from the photoelectric conversion element 106 is output to a signal processing device 121. The signal processing device 121 includes a front end 107, and a digital signal processor (DSP) 108, which will be described below.

The front end 107 is a member including a memory 300 and a transfer circuit 301 built therein, which will be described below. The front end 107 receives signals from the photoelectric conversion element 106, stores a part or all of the signals into the memory 300, and transmits the signals to the DSP 108, which is subsequent to the front end 107.

The DSP 108 performs a number of arithmetic and signal operations including image processing. The DSP 108 performs processing, such as a correction and a compression, on image data that has been imaged by the photoelectric conversion element 106 and transmitted from the front end 107. The DSP 108 further includes a separation function to separate the image data into A-image data and B-image data (described below), a correlation operation function to correlation operation using an A-signal and a B-signal for performing focus detection processing, and a function of processing the image signal to be displayed on a display unit 111 described below. Details regarding a flow of signal processing performed by the photoelectric conversion element 106, the front end 107, and the DSP 108 will be described below.

A random access memory (RAM) 109 includes a function as a signal retaining unit that retains a digital signal output from the front end 107, a function as an image data storage unit that stores the image data processed by the DSP 108, and a function as a work memory used when a central processing unit (CPU) 110 (described below) performs an operation. The RAM 109 is generally a dynamic random access memory (DRAM). The photoelectric conversion device is configured to achieve these functions using the RAM 109 in the present exemplary embodiment. However, another type of memory can also be used as long as the memory has a sufficient access speed without any operational problem. Although the RAM 109 is disposed outside the DSP 108 and the CPU 110 in the present exemplary embodiment, the photoelectric conversion device may be configured in such a manner that a part or all of the functions thereof are built in the DSP 108 or in the CPU 110.

The display unit 111 displays, for example, a still image or a moving image processed by the DSP 108, and a menu. An operation unit 112 sets, for example, an imaging command, and an imaging condition to the CPU 110. A recording medium 113 is an attachable/detachable recording medium that records the still image data and the moving image data therein. A read only memory (ROM) 114 stores a program that the CPU 110 loads and executes to control an operation of each of the units.

The CPU 110 comprehensively controls the operation of the photoelectric conversion element 106. The CPU 110 executes a program for controlling each unit included in the photoelectric conversion element 106. The CPU 110 also has a function of adjusting the focus of the imaging optical system 120 by controlling a focus driving circuit 116 (described below) using a result of the correlation calculation output from the DSP 108.

The CPU 110 controls a shutter driving circuit 115 and a diaphragm driving circuit 118 based on the setting set by the operation unit 112. The shutter driving circuit 115 controls driving of the focal-plane shutter 104 under control of the CPU 110. The diaphragm driving circuit 118 controls the aperture of the diaphragm 101 by controlling the diaphragm actuator 119.

Next, a configuration of the photoelectric conversion element 106 will be described with reference to FIGS. 2A to 2C. FIG. 2A illustrates a pixel array 200 (a pixel region) in which a plurality of pixels 201 is two-dimensionally laid out. The plurality of pixels 201 is laid out along an X axis in parallel with a row direction and a Y axis in parallel with a column direction.

As illustrated in FIG. 2A, the pixel array 200 includes an effective pixel region and a light shielded pixel region. The pixels 201 arranged in the effective pixel region are light receiving pixels where light is incident on photoelectric conversion portions 203a and 203b. On the other hand, the pixels 201 included in the light shielded pixel region are light shielded pixels (a first pixel) including the photoelectric conversion portions 203a and 203b shielded from the light. The photoelectric conversion portions 203a and 203b are, for example, photodiodes (PD). However, each of the photoelectric conversion portions 203a and 203b may be formed using a member other than the photodiode, and may be formed using, for example, a photoelectric conversion layer provided on a substrate (e.g., a semiconductor substrate, and a glass substrate).

Each of the light receiving pixels includes the plurality of photoelectric conversion portions 203a and 203b and a micro lens 202, and is configured in such a manner that the light is incident thereon after the light passes through the single micro lens 202. This configuration gives the photoelectric conversion portions 203a and 203b a pupil division structure, and causes different images indicating the same subject and having a phase difference therebetween to be incident on these two photoelectric conversion portions 203a and 203b. Hereinafter, these different two images indicating the same subject and having the phase difference therebetween are referred to as an "A-image" and a "B-image", and the photoelectric conversion portion 203a and the photoelectric conversion portion 203b serve as a photoelectric conversion portion for the A-image and a photoelectric conversion portion for the B-image, respectively. In other words, the A-image is formed from an "A-signal" based on electric charge generated in the photoelectric conversion portion 203a, and the B-image is formed from a "B-signal" based on electric charge generated in the photoelectric conversion portion 203b. In the present exemplary embodiment, the B-signal is generated by subtracting the A-signal from an (A+B)-signal, which is a sum of the A-signal and the B-signal, and the B-image is formed from the generated B-signal. Even in this case, the B-image is deemed to be formed from the B-signal.

Each of the light shielded pixels includes the plurality of photoelectric conversion portions 203a and 203b shielded from the light. Although the light shielded pixel includes a micro lens illustrated in FIG. 2A, the light shielded pixel may include no micro lens. The light shielded pixel outputs a black reference signal acquired from the plurality of photoelectric conversion portions 203a and 203b. Typically, the black reference signal is used to determine a black level of the light receiving pixel. For example, a black level signal is generated by averaging the black reference signals of the plurality of light shielded pixels. A signal noise ratio (hereinafter referred to as an S/N ratio) of the signal of the light receiving pixel can be improved by subtracting this black level signal from the signal of the light receiving pixel.

FIG. 2B illustrates a circuit configuration of the pixel 201. In FIG. 2B, the photoelectric conversion portion 203a and the photoelectric conversion portion 203b are the portions on which the light is incident after passing through the above-described single micro lens 202. At the light shielded pixel, the photoelectric conversion portions 203a and 203b are portions sharing one amplification transistor 207 therebetween. A transfer transistor TxA (e.g., 204a) for the A-image is controlled by a signal φtxa, and a transfer transistor TxB (e.g., 204b) for the B-image is controlled by a signal φtxb. By setting this signal φtxa or φtxb to High (hereinafter, H will be used to represent High), the transfer transistor 204a or 204b becomes conductive, and thus the electric charge accumulated in each of the photoelectric conversion portions 203a and 203b is transferred to a floating diffusion unit (FD) 205. The A-signal and the B-signal can be transferred independently of each other, because the conductivity/non-conductivity (i.e., ON/OFF) of these transfer transistors 204a and 204b can be controlled independently of each other.

A reset transistor 206 is a switch for initializing the FD 205, and is controlled by a signal φpres. The amplification transistor 207 is connected to a constant current source 212 (described below) via a selection transistor 208 and a vertical output line 211 (described below). When an input signal φsel of the selection transistor 208 is set to H, the amplification transistor 207 is connected to the constant current source 212. The FD 205 is connected to the amplification transistor 207. Thus, the electric charge transferred from the photoelectric conversion portion 203a or 203b to the FD 205 are converted into a voltage value based on electric charge amount by the amplification transistor 207, and are output to the vertical output line 211 as a signal. Each of the transistors is formed using, for example, a metal-oxide semiconductor (MOS) transistor.

The signal acquired as the sum of the signal from the photoelectric conversion portion 203a, which is one of the photoelectric conversion portions, and the signal from the photoelectric conversion portion 203b, which is the other of the photoelectric conversion portions, can be used as a signal for the image. The sum of the signals is hereinafter referred to as the "(A+B)-signal". The two signals read out from the photoelectric conversion portions 203a and 203b can be used as signals for the focus detection.

The (A+B)-signal for the image, and the A-signal and the B-signal for the focus detection may be read out individually, but may be read out in the following manner in consideration of a processing load. The signal of the plurality of photoelectric conversion portions 203a and 203b (i.e., the (A+B)-signal), and the signal for the focus detection generated in any one of the photoelectric conversion portions 203a and 203b (e.g., the A-signal) are read out. The other signal for the focus detection having a parallax (e.g., the B-signal) is acquired by calculating a difference between the (A+B)-signal and the one of the signals for the focus detection. Alternatively, the signals for the focus detection acquired from the photoelectric conversion portions 203a and 203b (i.e., the A-signal and the B-signal) are read out individually, and the signal for the image (the (A+B)-signal) is acquired by adding the signals for the focus detection.

FIG. 2C illustrates a detailed circuit configuration of the photoelectric conversion element 106. As described above, the plurality of pixels 201 is laid out in the pixel array 200. FIG. 2C illustrates the circuit configuration, omitting the light shielded pixels therein.

A timing generator (TG) 210 supplies a control pulse required for the readout to each circuit according to a program set by the CPU 110.

A vertical scanning circuit 209 supplies a pulse to the pixel 201 and the signal stored in the pixel 201 is output to the vertical output line 211. The vertical scanning circuit 209 can also select a specific pixel and switch driving between the selected pixel and a non-selected pixel. The TG 210 is built in the photoelectric conversion element 106 in the present exemplary embodiment, but may be disposed outside the photoelectric conversion element 106.

The signal generated by the photoelectric conversion portion 203a or 203b included in each of the pixels 201 is output to the vertical output line 211 row by row based on the driving signal supplied from the vertical scanning circuit 209 as described above. The constant current source 212 forms a source follower circuit in combination with the above-described amplification transistor 207.

A readout circuit 213 has a function of amplifying the output from the vertical output line 211 for each column. An analog-to-digital (AD) conversion circuit (ADC) 214 converts an output of the readout circuit 213 into a digital signal. The digital signal converted by the ADC 214 is sequentially selected by a horizontal scanning circuit 215, subjected to image processing by an image processing unit 216 as necessary, and output from an output unit 217 to outside the photoelectric conversion element 106.

Next, detailed configurations of the photoelectric conversion element 106, the front end 107, and the DSP 108 will be described with reference to FIG. 3.

The front end 107 includes the memory 300 and the transfer circuit 301 as described above. The memory 300 stores the digital signal output from the output unit 217 of the photoelectric conversion element 106. More specifically, the digital signal output from the pixel array 200 via the output unit 217 is stored into the memory 300. For example, a RAM can be used as the memory 300, and a DRAM or a static random access memory (SRAM) is also applicable. As will be described in detail below, the use of the SRAM is suitable in a case where the signal is supposed to be output from the memory 300 in a different order from the order of address in the memory 300. A memory different from the RAM can also be used as long as an access speed of the memory is sufficiently high and no operational problem arises therefrom. The transfer circuit 301 transfers the digital signal stored in the memory 300 to the DSP 108.

The front end 107 further includes a control circuit 302. The control circuit 302 controls the memory 300 and the transfer circuit 301 to specify an order in which the digital signal is transferred.

The DSP 108 includes a reception circuit 303 and an arithmetic operation processing circuit (hereinafter referred to as an arithmetic operation circuit) 305. The reception circuit 303 transmits the digital signal transferred from the front end 107 to the arithmetic operation circuit 305. The arithmetic operation circuit 305 can carry out various arithmetic operations based on pixel information. Processing to acquire a defocus amount for driving the lens 102 and the lens 103 is described as one example of the arithmetic operation below. In the processing, a correlation calculation between the A-signal and the B-signal is used. The photoelectric conversion device will be described assuming that all the pixels 201 are subject to the pupil division in the present exemplary embodiment. However, only a part of the pixels 201 may be subject to the pupil division (i.e., the pixel array 200 includes a pixel not subject to the pupil division) and the phase difference detection is carried out using the pixels 201 subject to the pupil division.

The arithmetic operation circuit 305 can carry out other arithmetic operations such as an arithmetic operation for generating the image to be displayed on the display unit 111, an arithmetic operation for generating a depth map for acquiring depth information of the image from the A-image and the B-image, a tracking operation for detecting a motion of the subject, and an automatic exposure (AE) operation for controlling the exposure. The arithmetic operations may also include a white balance (WB) operation for determining white balance of the image, an operation for detecting a flicker of the image, and a light adjustment arithmetic operation for determining a light emission amount of a flash. The arithmetic operations that the operation circuit 305 can carry out are not limited to the configuration and the arithmetic operations described above.

The arithmetic operations carried out by the arithmetic operation circuit 305 included in the DSP 108 are not necessarily arithmetic operations that require information about all the pixels 201 laid out in the pixel array 200.

Figure 4A:
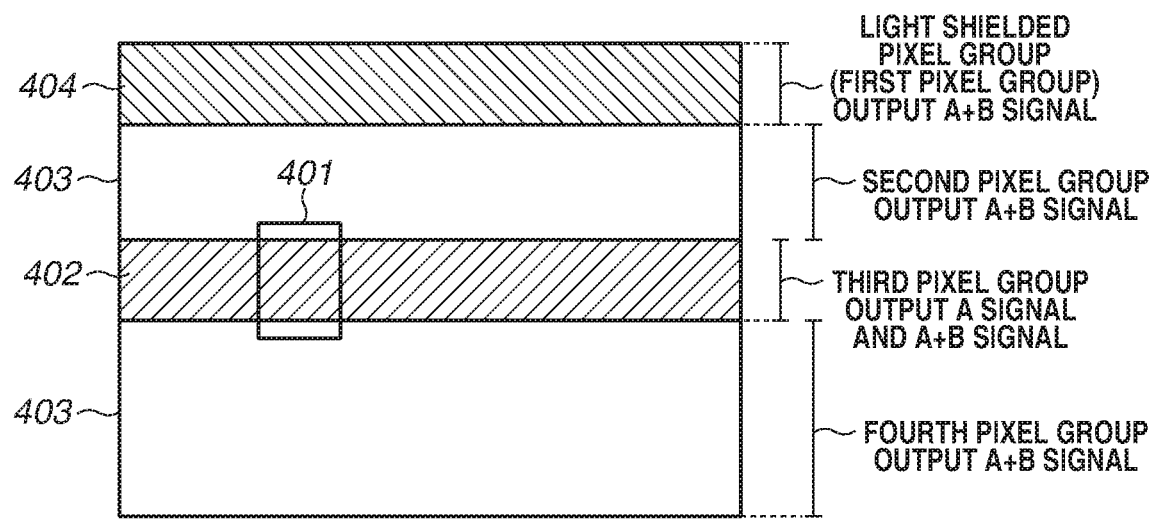
FIG. 4A illustrates an arrangement of pixel groups.

FIG. 4A illustrates an example of the layout of each of the pixels 201 laid out in the pixel array 200 and an example schematically indicating the signal output from each of the pixels 201. As illustrated in FIG. 4A, the pixel array 200 includes a light shielded pixel group including the first pixel shielded from the light, a second pixel group including a second pixel, which receives light and outputs the signal for the image, and a third pixel group including a third pixel, which receives light and outputs the signals for the focus detection. In FIG. 4A, the pixel array 200 further includes a fourth pixel group including a fourth pixel, which receives light and outputs the signal for the image. The second pixel and the fourth pixel are configured similarly to each other, and only positions are not the same at which the pixels are placed in the pixel array 200. For example, in a case where the pixel array 200 includes n pixel rows (n is an integer of 1 or larger), the pixel array 200 outputs the signals sequentially from each pixel 201 arranged in the first pixel row to each pixel 201 arranged in the n-th pixel row. More specifically, in the example illustrated in FIG. 4A, the pixel array 200 outputs the signals in the order of the light shielded pixel (i.e., the first pixel) group, the second pixel group, the third pixel group, and the fourth pixel group. In other words, the pixel array 200 outputs the signals in the order of the (A+B)-signal acquired based on the electric charge generated in the plurality of photoelectric conversion portions 203a and 203b included in the light shielded pixel, the (A+B)-signal generated in the second pixel located between the light shielded pixel and the third pixel, the A-signal and the (A+B)-signal generated in the third pixel, and the (A+B)-signal generated in the fourth pixel. Hereinafter, the (A+B)-signal acquired based on the electric charge generated in the plurality of photoelectric conversion portions 203a and 203b included in the light shielded pixel may be referred to as a first signal. The (A+B)-signal generated in the second pixel arranged between the light shielded pixel and the third pixel may be referred to as a second signal. Further, the A-signal and the (A+B)-signal generated in the third pixel arranged between the second pixel and the fourth pixel may be referred to as a third signal. The (A+B)-signal generated in the fourth pixel may be referred to as a fourth signal.

The pixel array 200 reads out the (A+B)-signal from the light shielded pixel group and the second pixel group. The pixel array 200 reads out the A-signal from the third pixel group in addition to the (A+B)-signal. As illustrated in FIG. 4A, the pixel array 200 does not read out the A-signal from the light shielded pixel group and the second pixel group during a certain frame period. More specifically, the pixel array 200 is configured not to output the A-signal from each of the pixels arranged in the light shielded pixel group and the second pixel group to the vertical output line 211 during the certain frame period. In the present exemplary embodiment, one frame period is a period since the photoelectric conversion device starts to generate the signals (e.g., a start of a period during which the photoelectric conversion element 106 accumulates the electric charge) until the photoelectric conversion device ends the readout of the signals from the pixels 201 for generating one image (e.g., a period until the vertical scanning circuit 209 ends the scan of the pixel array 200). The one frame period may also be defined as a period from the time when the vertical scanning circuit 209 starts scanning (i.e., the vertically scan) of the plurality of pixels 201 row by row to the time when the vertical scanning circuit 209 reaches the last row and ends the vertical scan. The one frame period may also be a period from the time when some row is selected by the vertical scanning circuit 209 first to the time when this row is selected by the vertical scanning circuit 209 next time, in a case where the signals are read out with the pixel array 200 divided into a plurality of fields.

As described above, in the present exemplary embodiment, the pixel array 200 is configured not to output the A-signal from the pixels arranged in the light shielded pixel group and the second pixel group to the vertical output line 211 during the certain frame period. The readout method is not limited thereto, and any method may be employed as long as the A-signal from the pixels included in the light shielded pixel group and the second pixel group is not read out from the photoelectric conversion element 106. One possible example is a method that outputs the signal from each of the pixels but does not carry out the AD conversion on the signals from the pixels included in the light shielded pixel group and the second pixel group. Other possible examples include a method that inputs the A-signal to the horizontal scanning circuit 215 but does not output the A-signal from the horizontal scanning circuit 215, and a method that inputs the A-signal to the output unit 217 but does not output the A-signal from the output unit 217. Although another method is possible which does not constantly output the A-signal from the pixels arranged in the light shielded pixel group and the second pixel group, the A-signal may be output from each of the pixels at least arranged in the second pixel group during another frame period.

Figure 4B:
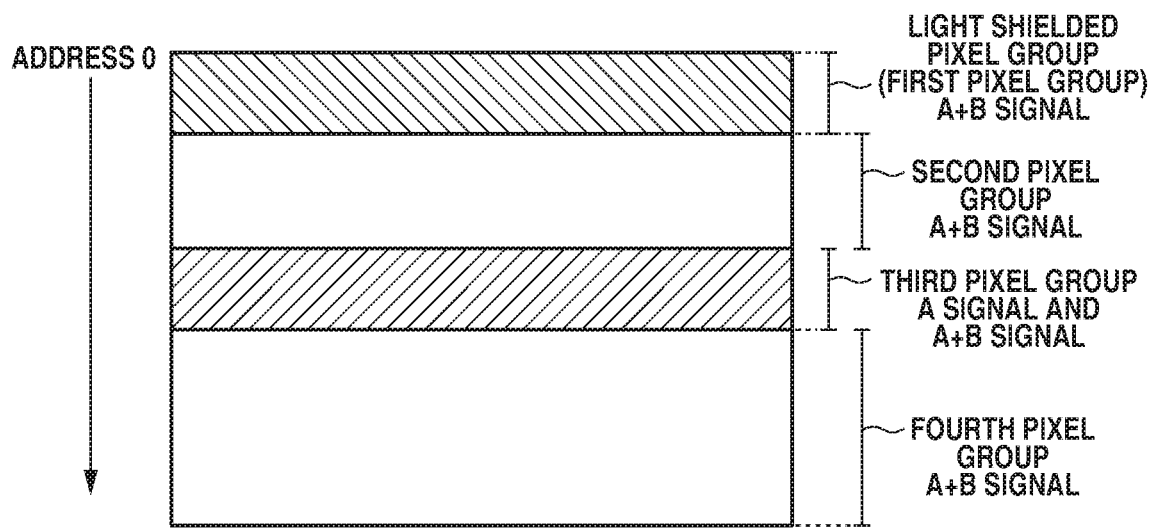
FIG. 4B illustrates addresses of digital signals stored in a memory.

FIG. 4B illustrates an example indicating an order of the digital signals to be stored in the memory 300. As illustrated in FIG. 4B, the digital signals are stored into the memory 300 from the beginning address in the order of output from the output unit 217. In other words, the digital signals are input to the memory 300 in the order of the first signal, the second signal, the third signal, and the fourth signal. In the present exemplary embodiment, the signals are output from the memory 300 in the order of the first signal, the third signal, the second signal, and the fourth signal. The signals are then input to the DSP 108 in this order. As described above, the DRAM is typically used as the RAM 109. The DRAM is less flexible about a change of the order of writing data therein and the order of reading out the data therefrom, compared to the SRAM. Therefore, the data can be written into and read out from the DRAM at a high speed by setting a specific order according to the design of the DRAM as the order of writing the data into the DRAM and the order of reading out the data from the DRAM. The setting of this specific order allows the DRAM to be driven at a high speed especially when the data is sequentially and successively read out, for example, from the beginning address in the DRAM. According to each of the exemplary embodiments below, the order of the signals is changed before the signals are input to the arithmetic operation circuit 305 to allow the signals to be output sequentially from the beginning address in the RAM 109. Since the DRAM can be driven at an improved speed when outputting the signals sequentially from the beginning address, the photoelectric conversion device can suppress a slowdown of a signal processing speed used in the DSP 108, thereby preventing decrease of a frame rate.

Figure 5:
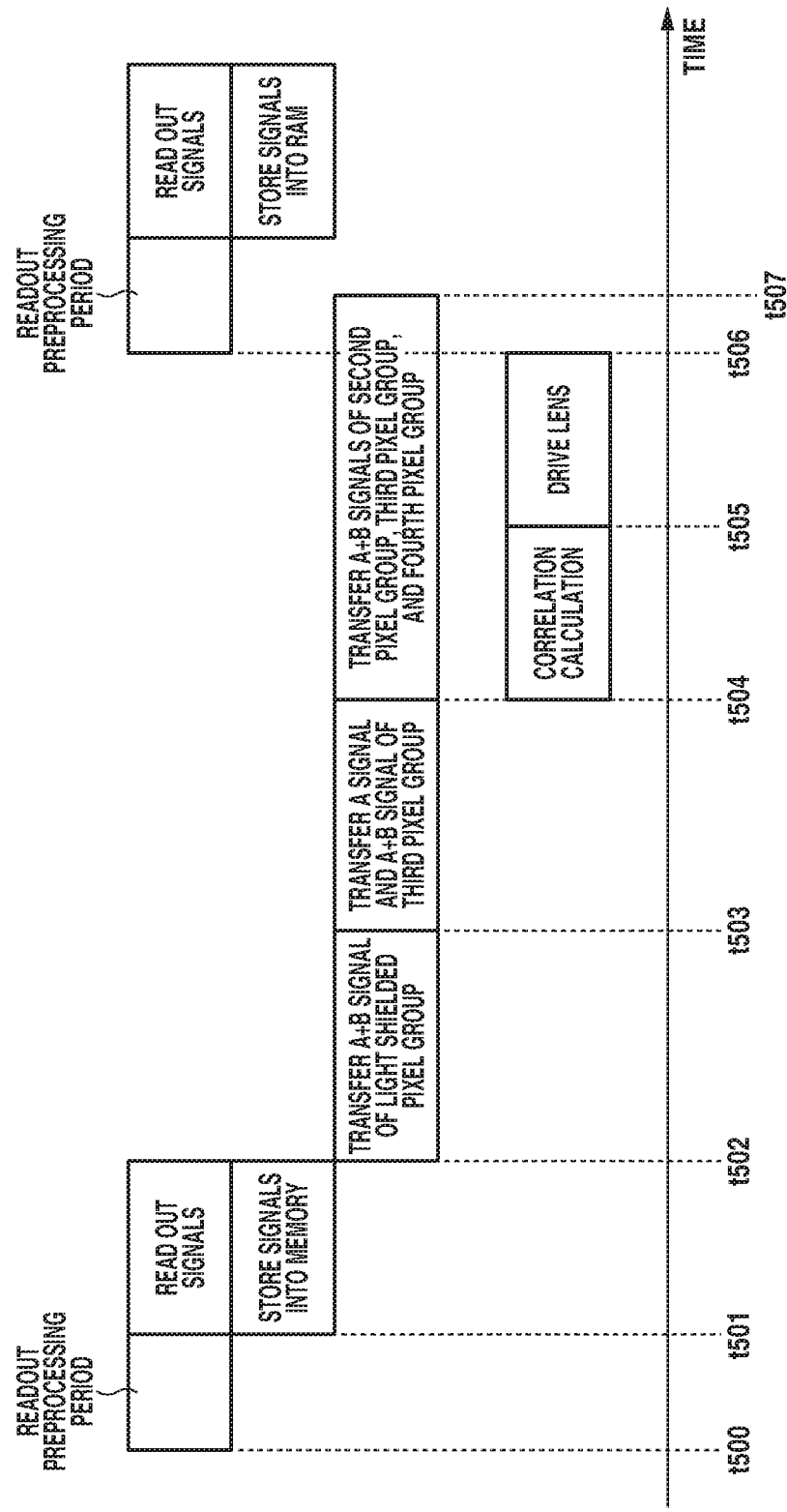
FIG. 5 is a timing chart illustrating an operation of the photoelectric conversion device according to the first exemplary embodiment.

Next, the description will be continued, focusing on processing when the photoelectric conversion device carries out the correlation arithmetic operation by the arithmetic operation circuit 305, drives the lens based on this information, and captures an image of a next frame after capturing the image, with reference to a timing chart illustrated in FIG. 5.

The accumulation of the electric charges is started at time t500, and the readout of the signals from the pixel array 200 is started at time t501. A readout preprocessing period, which corresponds to a period from time t500 to time t501, includes a period during which the electric charges are accumulated in the photoelectric conversion portions 203a and 203b, an AD conversion period, a period during which the signals are output to the horizontal scanning circuit 215, and a period during which the signals are transferred to the output unit 217. In other words, a period since reset of the photoelectric conversion portions 203a and 203b is ended until before the signals are read out from the output unit 217 corresponds to the readout preprocessing period. A period after the signals are output from the photoelectric conversion element 106 until the storage of the signals into the memory 300 is completed corresponds to a readout period.

When the signals are read out, the signal acquired from each of the pixels 201 is output from the pixel array 200 in the order of spatial layout, regardless of which group the pixel 201 belongs to, the second pixel group 403 or the third pixel group 402. As an example of the acquisition of the signals output from the pixels 201, the signals are being acquired sequentially, for example, starting from a top in the pixel array 200. This method prevents the order from being temporally changed in the pixel array 200 and ensures linearity of a slit rolling distortion, thereby making the image more natural. Pixel information (e.g., header information) read out at the same time as the readout of the signals starts to be stored into the memory 300.

At time t502, the readout of the signals and the storage thereof into the memory 300 are completed, and, along therewith, the first signal output from each of the light shielded pixels included in the light shielded pixel group 404 is output from the memory 300. The first signal then starts to be transferred from the transfer circuit 301 of the front end 107 to the DSP 108. The first signal acquired based on the electric charges generated in the plurality of photoelectric conversion portions 203a and 203b included in the light shielded pixels is used in the image processing executed in the DSP 108. More specifically, the first signal is used to improve an S/N ratio of the signal of the light receiving pixel as described above. The first signal is used, in particular, as a reference value for subtracting noise data such as thermal noise. The A-signal and the B-signal may not be required to satisfy high accuracy for the first signal, compared to the third signal intended to be used to carry out the focus detection by comparing the A-signal and the B-signal. Thus, the reference value of the A-signal, in the present exemplary embodiment, is acquired by outputting the (A+B)-signal as the first signal and calculating a value into which the (A+B)-signal is divided by the number of photoelectric conversion portions per pixel. In such a case, a certain period of time is required to generate the A-signal of the first pixel. According to the present exemplary embodiment, the first signal is output before the second signal and the third signal are output, and thus the time for the processing for calculating the A-signal can be secured. The reference value of the A-signal can also be acquired by providing a predetermined value to the (A+B)-signal as an offset. The reference value of the A-signal can typically be acquired by performing processing of subtracting a predetermined value from the (A+B)-signal.

At time t503, the transfer of each signal of all the light shielded pixels included in the light shielded pixel group 404 is completed, and, along therewith, the A-signal and the (A+B)-signal acquired from each of the pixels included in the third pixel group 402 are output from the memory 300. The signal acquired from each of the pixels included in the second pixel group 403 is stored into the memory 300 prior to the signal acquired from each of the pixels included in the third pixel group 402, but is not output while being kept stored in the memory 300 at this time. In other words, the third signal is output prior to the second signal read out from the pixel array 200.

At time t504, the transfers of the A-signal and the (A+B)-signal of each of all the third pixels included in the third pixel group 402 are completed, and, along therewith, the correlation operation between the A-signal and the B-signal is started by the arithmetic operation circuit 305 included in the DSP 108. Further, the (A+B)-signal of the second pixel group 403, the (A+B)-signal of the third pixel group 402, and the (A+B)-signal of the fourth pixel group 403 start to be transferred from the memory 300. The (A+B)-signal of the third pixel group 402 is output to the DSP 108 during a period from time t503 to time t504. However, outputting the (A+B)-signal of the third pixel group 402 again after outputting the (A+B)-signal of the second signal allows the signals to be input to the RAM 109 according to the order of output from the RAM 109.

At time t505, the correlation operation is completed, and the lens 100 starts to be driven based on a result thereof.

At time t506, the driving of the lens 100 is completed, and the photoelectric conversion device becomes ready to start the next accumulation. At the same time, the accumulation of electric charge in the photoelectric conversion portions 203a and 203b for the next frame is started.

At time t507, the transfers of the second signal, the (A+B)-signal of the third pixel group 402, and the fourth signal, which have started to be transferred at time t504, are completed. Image capturing of one image is ended with this completion of the transfers of the second signal, the (A+B)-signal of the third pixel group 402, and the fourth signal.

In the present timing chart, the correlation operation has been described assuming that it is started after the transfer of the signal output from the third pixel group 402 from the memory 300 to the DSP 108 is completed. However, the arithmetic operation does not have to wait to be started until all the transfers of the signals of the third pixel group 402 from the memory to outside the photoelectric conversion element 106 end, if the correlation operation can be started using only a part of the pixel information of the third pixel group 402.

Next, a plurality of specific examples regarding configurations of chips on which the photoelectric conversion element 106, the front end 107, and the DSP 108 are mounted will be described with reference to FIGS. 6A to 6D.

Figure 6A:
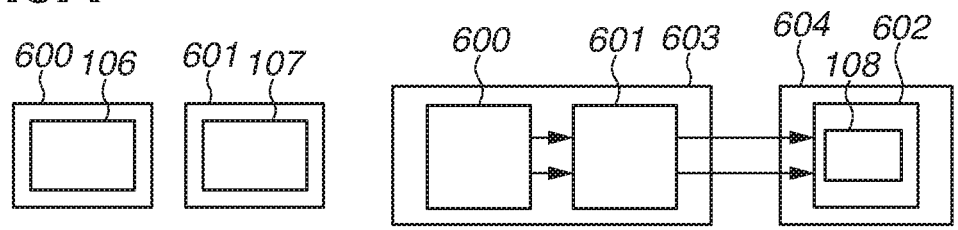
FIGS. 6A to 6D illustrate examples of implementing the photoelectric conversion device according to the first exemplary embodiment.

In an example illustrated in FIG. 6A, a chip 600 includes a semiconductor substrate including the photoelectric conversion element 106. A chip 601 includes a semiconductor substrate including the front end 107, and is different from the semiconductor substrate included in the chip 600. Then, the chip 600 and the chip 601 are mounted on a mounting substrate 603 including a conductive region. A chip 602 includes the DSP 108, and is mounted on a mounting substrate 604 including a conductive region. The photoelectric conversion element 106, the front end 107, and the DSP 108 are electrically connected to one another.

Figure 6B:
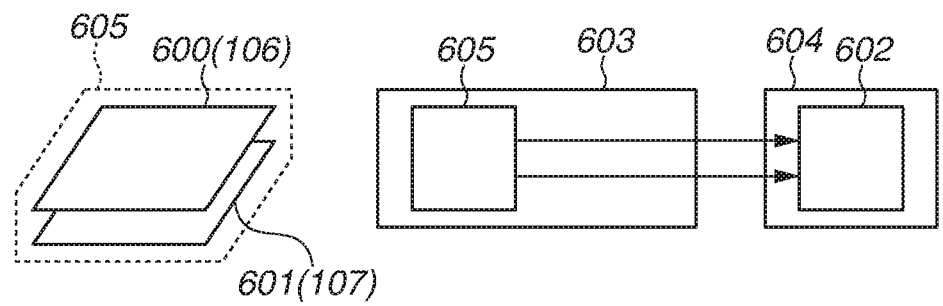

An example illustrated in FIG. 6B is different from the example illustrated in FIG. 6A in that a chip 605 is formed by stacking the chip 600 and the chip 601, and is mounted on the mounting substrate 603.

Figure 6C:
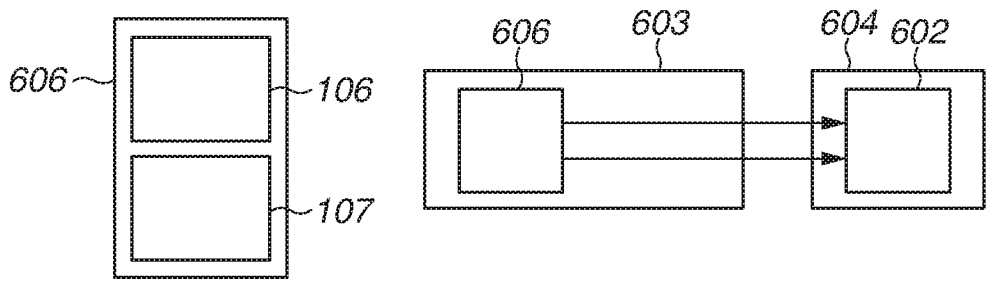

In an example illustrated in FIG. 6C, a chip 606 forms a fifth chip 606 due to arrangement of the photoelectric conversion element 106 and the front end 107 on one semiconductor substrate. The fifth chip 606 is mounted on the mounting substrate 603, and is connected to the first chip 602 mounted on the mounting substrate 604. The first chip 602 includes at least the DSP 108.

Figure 6D:
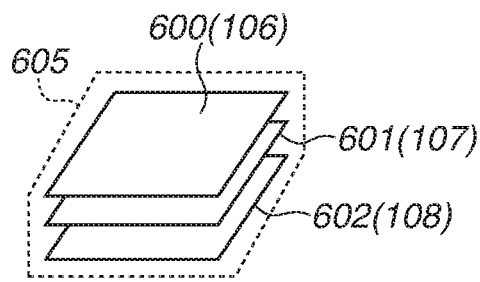

An example illustrated in FIG. 6D is different from the example illustrated in FIG. 6A in that the chip 602, the chip 601, and the chip 600 are stacked in this order. The positions of the chip 601 and the chip 602 may be exchanged.

According to the present exemplary embodiment described above, the photoelectric conversion device can transfer the pixels starting from the pixel information to be used for the arithmetic operation required to capture the image in a state that the reference value for the correction is acquired, while acquiring the information from the pixels in the order of making the image more natural. Thus, the photoelectric conversion device can start the correction processing by the arithmetic operation circuit 305 from a timing at which the signal of the third pixel group 402 is input to the arithmetic operation circuit 305. Further, the order of the signals input to the arithmetic operation circuit 305 and the order of the signals output from the arithmetic operation circuit 305 are the same. If the order of the signals input to the arithmetic operation circuit 305 and the order of the signals output from the arithmetic operation circuit 305 are different from each other, the frame rate may reduce due to a slowdown of a driving speed to output signals from the RAM 109. On the other hand, according to the present exemplary embodiment, the photoelectric conversion device can suppress the slowdown of the processing speed at the arithmetic operation processing device, thereby improving the frame rate. Further, according to the present exemplary embodiment, the A-signal and the (A+B)-signal of the third pixel group 402 are input to the arithmetic operation circuit 305 before the (A+B)-signal of the second pixel group 403 is input to the arithmetic operation circuit 305. Due to this configuration, the photoelectric conversion device can advance the timing of starting the correlation arithmetic operation regarding the focus detection, thereby further quickly carrying out the focus detection. Due to this configuration, the photoelectric conversion device can also quickly perform a focusing operation to drive the lens based on the result of the focus detection. Therefore, the photoelectric conversion device according to the present exemplary embodiment causes an effect of quick start of the electric charge accumulation operation for the next frame.

The first exemplary embodiment can be modified into the following configurations. Even in the following modifications of configuration, similar effects to the first exemplary embodiment can be obtained.

In FIG. 1, the digital signal after the AD conversion is output from the photoelectric conversion element 106. The photoelectric conversion device is not limited thereto, and an analog signal may be output from the photoelectric conversion element 106. In this case, a memory that saves a voltage value in the form of the analog signal can be used as the memory 300. However, a leak current or the like may occur in the analog signal stored in the memory 300, and an image generated therefrom may be deteriorated. In the present exemplary embodiment, the third signal is output first with the second signal stored in the memory 300, and this means that the second signal is kept stored in the memory 300 for a longer period compared to when the signals are output in the order of spatial layout. For this reason, it is desirable that the photoelectric conversion device is configured to store, in the memory 300, the digital signal less likely to be deteriorated due to the leak current or the like compared to the analog signal.

In FIG. 4A, the row containing the light shielded pixel is formed only by the plurality of light shielded pixels. The photoelectric conversion device is not limited thereto, and one row may contain the light shielded pixel and the second pixel.

In a case where the pixel row containing the light shielded pixel and the second pixel in one row is located between the light shielded pixel group 404 and the third pixel group 402, the signal from the pixel row containing the light shielded pixel and the second pixel may be output after the signal from the pixel row in the third pixel group 402 is output from the memory 300.

One image may be formed based on the signals read out from the entire pixel array 200. However, an image may be formed by reading out the signals while cropping a partial region in the pixel array 200. A distance measurement frame 401 is a region containing the subject that is set via, for example, the operation unit 112. The correlation operation is carried out by the arithmetic operation circuit 305 using the pixel information in the frame 401. A pixel for use in the correlation operation can be selected using, for example, the vertical scanning circuit 209. Assuming that the third pixel group 402 is selected and the second pixel group 403 is not selected, the third pixel group 402 is used in the arithmetic operation by the arithmetic operation circuit 305 and the second pixel group 403 is not used by the arithmetic operation circuit 305.

Figure 7:
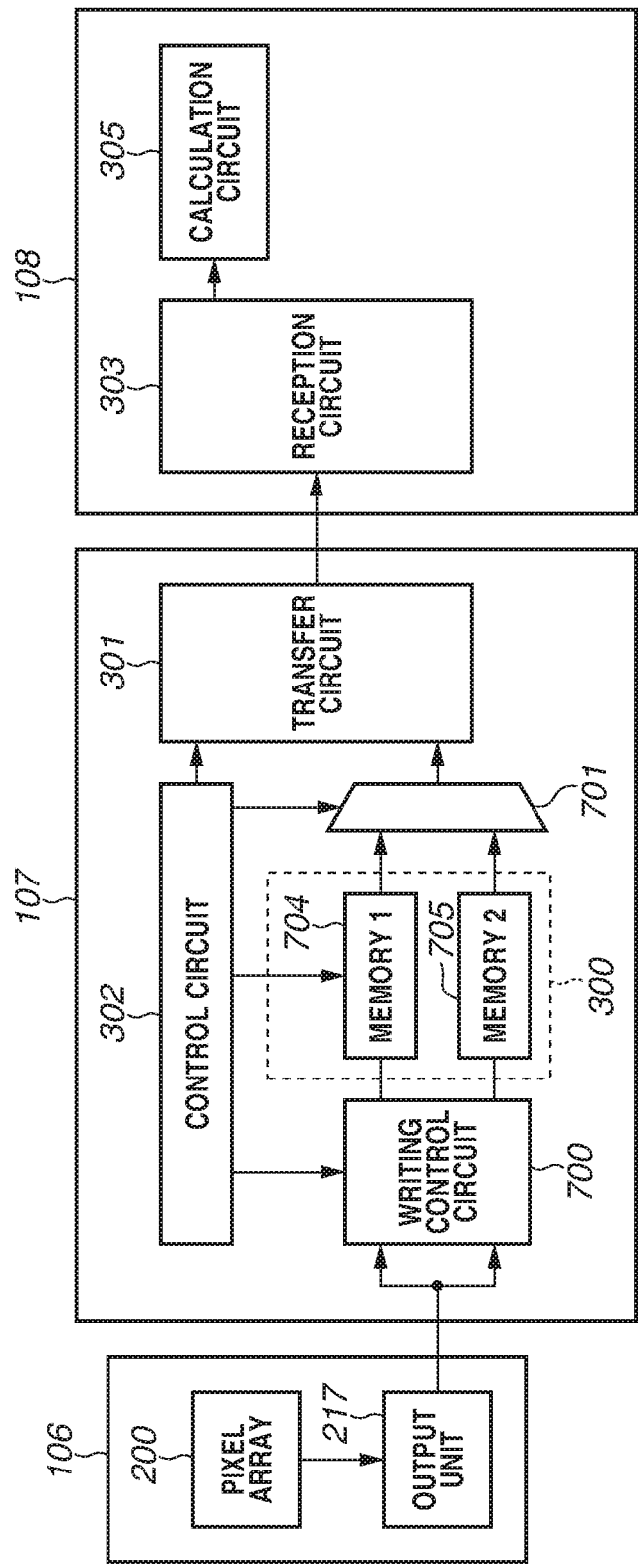
FIG. 7 is a block diagram illustrating an internal configuration of a photoelectric conversion device according to a second exemplary embodiment.

FIG. 7 is a block diagram illustrating configurations of the photoelectric conversion element 106, the front end 107, and the DSP 108 according to a second exemplary embodiment. The second exemplary embodiment is different from the first exemplary embodiment in that the front end 107 includes a writing control circuit 700 and a selector 701 built therein, and that the memory 300 includes a plurality of memories such as memory 704 and memory 705. The other configurations are substantially similar to those of the first exemplary embodiment.

The writing control circuit 700 can determine whether to input the pixel information output from the photoelectric conversion element 106 to the memory 704, the memory 705, or both of them, based on a control signal from the control circuit 302. The selector 701 can determine whether to transfer the pixel information from the memory 704 or the pixel information from the memory 705 as the pixel information to transfer from the transfer circuit 301, based on a control signal from the control circuit 302.

Figure 8:
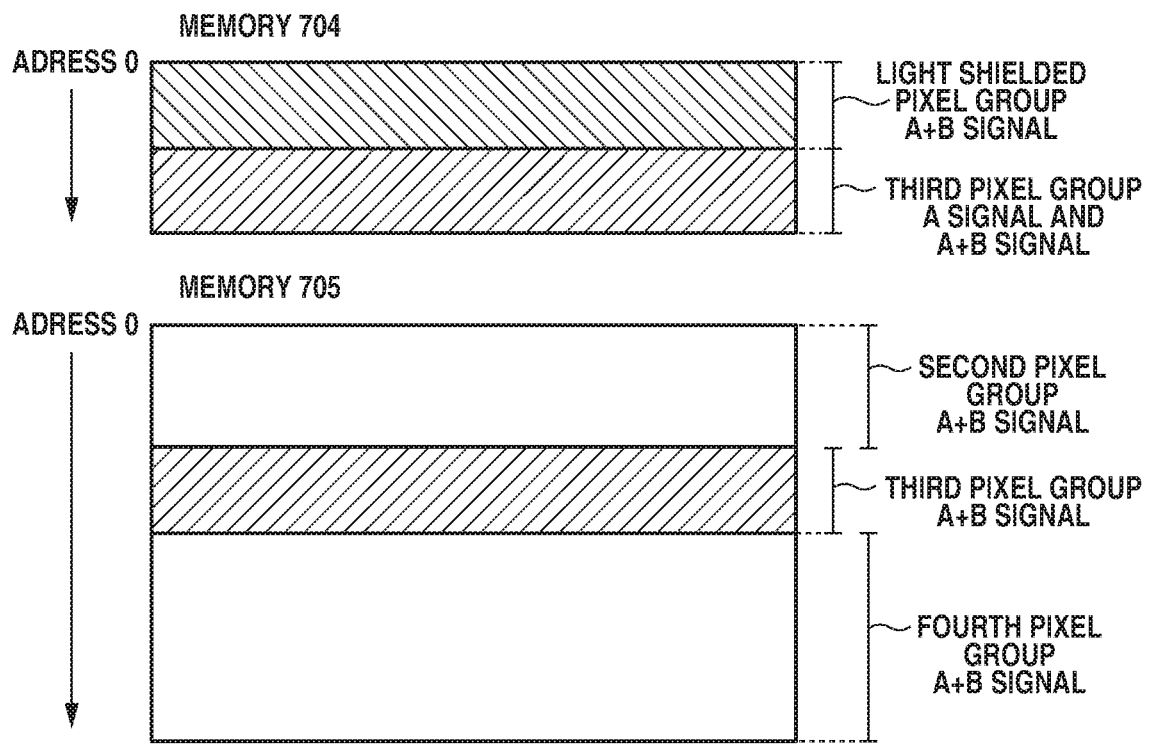
FIG. 8 illustrates outputs from memories of the photoelectric conversion device according to the second exemplary embodiment.

FIG. 8 illustrates an example indicating image information stored in the memory 704 and the memory 705 and an order thereof according to the second exemplary embodiment. The image information of the (A+B)-signal output from the light shielded pixel group 404, and the A-signal and the (A+B)-signal output from the third pixel group 402 is stored in the memory 704. The image information of the (A+B)-signals of the third pixel group 402 and the second pixel group 403 is stored in the memory 705. In the present exemplary embodiment, the order of the signals is changed before the signals are input to the memories 704 and 705 so as to allow the signals to be output sequentially starting from the beginning address in the memories 704 and 705. In the present exemplary embodiment, the use of the DRAM is desirable as each of the memories 704 and 705 because the signals can be successively output in the order of address.

An operation of the photoelectric conversion device according to the second exemplary embodiment will be described with reference to a timing chart illustrated in FIG. 9. In the timing chart illustrated in FIG. 9, the (A+B)-signal of the light shielded pixel is stored into the memory 704. The (A+B)-signal of the third pixel is stored into both the memories 704 and 705, and the A-signal of the third pixel is also stored into the memory 704. The (A+B)-signal of the second pixel is stored into the memory 705.

The accumulation starts at time t900, and the readout of the signals starts at time t901. Similarly to the first exemplary embodiment, the signals are read out from the pixel array 200 in predetermined order regardless of which group the pixel 201 belongs to, the light shielded pixel group 404, the third pixel group 402, or the second pixel group 403. In other words, the signals are read out from the pixel array 200 sequentially starting from the top of the screen. At the same time as the readout of the signals, the read out signals start to be stored into the memory 704 and the memory 705.

At time t902, the (A+B)-signal of the light shielded pixel group 404 stored in the memory 704 starts to be read out. At this time, the control circuit 302 controls the selector 701 so that the transfer circuit 301 can transfer the signal from the memory 704 to the DSP 108, and starts to transfer the signal of the light shielded pixel group 404 to the DSP 108.

At time t903, the A-signal and the (A+B)-signal of the third pixel group 402 stored in the memory 704 start to be transferred to the DSP 108.

At time t904, the transfer of the third pixel group 402 is completed, and, along therewith, the correlation operation can be started. At the same time, the (A+B)-signal of the second pixel group 403, the (A+B)-signal of the third pixel group 402, and the (A+B)-signal of the second pixel group 403 stored in the memory 705 start to be transferred. At this time, the control circuit 302 controls the selector 701 so that the transfer circuit 301 can transfer the signals from the memory 705 to the DSP 108.

At time t905, the correlation operation is completed, and the lens 100 starts to be driven based on a result thereof.

At time t906, the driving of the lens 100 is completed, and the photoelectric conversion device becomes ready to start the next accumulation. At the same time, the accumulation for the next frame starts. At time t907, the transfers of the (A+B)-signal of the third pixel group 402 and the (A+B)-signal of the second pixel group 403, which have started to be transferred at time t904, are completed.

Figure 9:
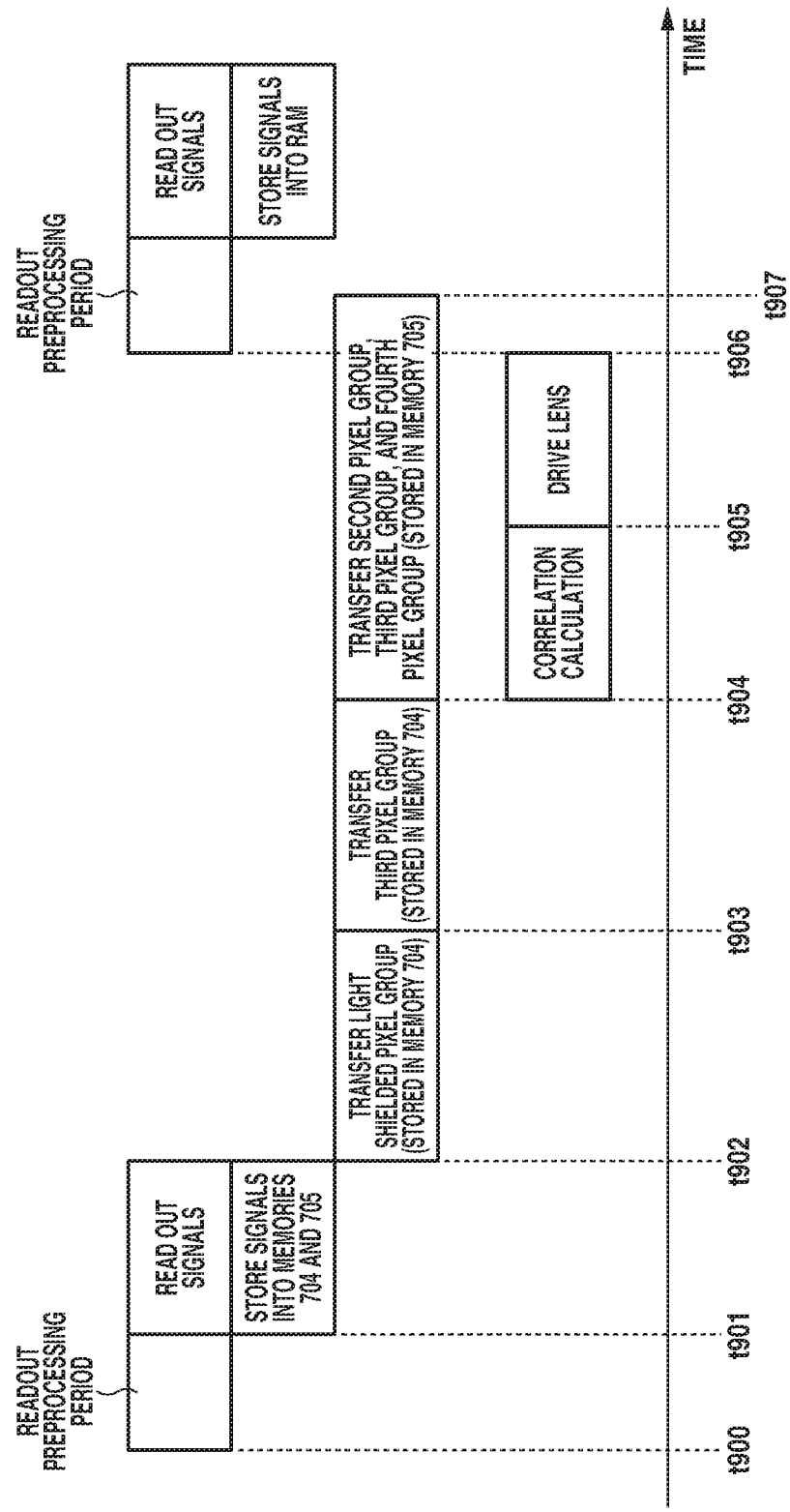
FIG. 9 is a timing chart illustrating an operation of the photoelectric conversion device according to the second exemplary embodiment.

In the above-described manner, performing the operation illustrated in FIG. 9 allows the signals stored in the memories 704 and 705 to be read out in the order of storage. As a method for the readout, the order of the signals is rearranged in advance in the order in which they will be read out, before the signals are stored into the memories 704 and 705. As described above, this method is especially suitable for a case where a memory effective for the readout in the order of storage, such as the DRAM, is used as the memories 704 and 705. A memory different from the DRAM may be used as the memories 704 and 705, and naturally, the memory described in the first exemplary embodiment can be used as the memories 704 and 705.

Figure 10:
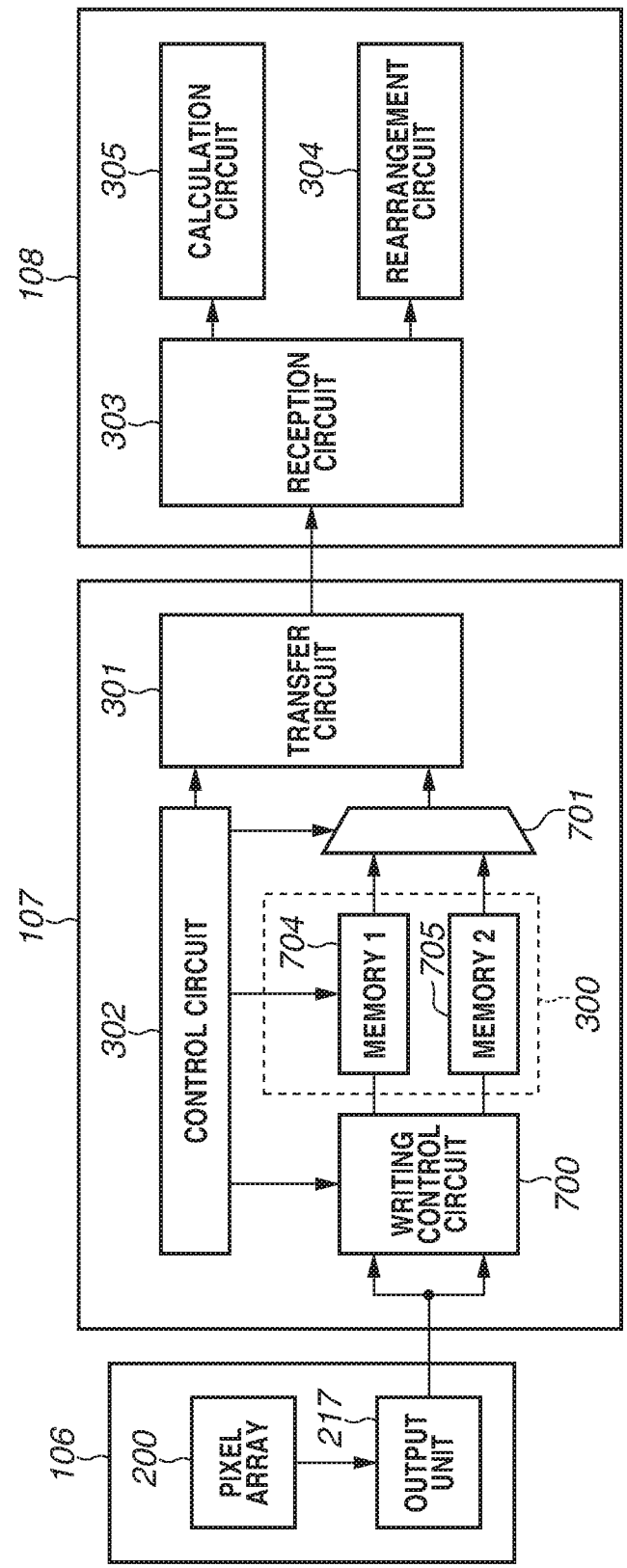
FIG. 10 is a block diagram illustrating an internal configuration of a photoelectric conversion device according to a third exemplary embodiment.
Figure 11:
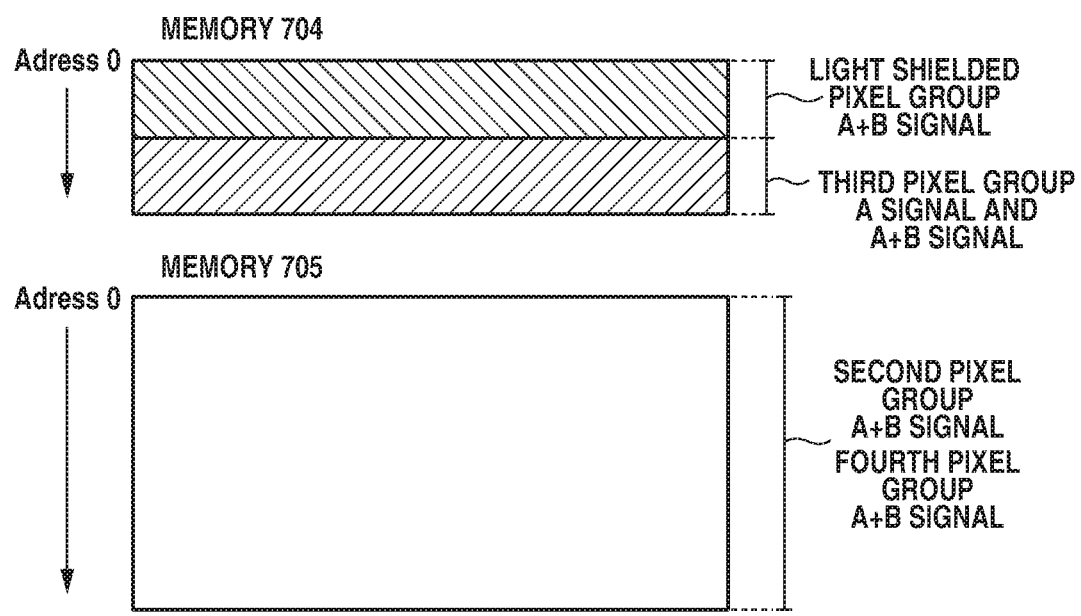
FIG. 11 illustrates outputs from memories of the photoelectric conversion device according to the third exemplary embodiment.

FIG. 10 is a block diagram illustrating configurations of the photoelectric conversion element 106, the front end 107, and the DSP 108 according to a third exemplary embodiment. FIG. 11 illustrates image information input to each of the memories 704 and 705 of the photoelectric conversion device and an order thereof according to the third exemplary embodiment. FIG. 12 illustrates a timing chart of an operation of the photoelectric conversion device according to the third exemplary embodiment.

The photoelectric conversion device according to the third exemplary embodiment is different from the second exemplary embodiment in that the photoelectric conversion device performs the arithmetic operation processing by the arithmetic operation circuit 305 while reducing the number of times that the (A+B)-signal of the third pixel group 402 is transferred by using a rearrangement circuit 304. Accordingly, transfers for redundant signals can be omitted. More specifically, the (A+B)-signal used to generate the signal for the focus detection is also used as the signal for the image, which eliminates the necessity of reading out the (A+B)-signal of the third pixel again.

The rearrangement circuit 304 rearranges the order of the digital signals input to the DSP 108 in such a manner that this order matches the order of spatial location in the pixel array 200 before these signals are input to the RAM 109.

As illustrated in FIG. 11, the (A+B)-signal of the light shielded pixel group 404, and the A-signal and the (A+B)-signal of the third pixel group 402 are stored in the memory 704. The (A+B)-signal of the second pixel group 403 is stored in the memory 705.

As illustrated in the timing chart of FIG. 12, the accumulation is started at time t1100, and the signals output from the pixel array 200 start to be stored into the memory 704 and the memory 705 at time t1101. At the same time, the signals stored in the memories 704 and 705 start being read out.

At time t1102, the (A+B)-signal of the light shielded pixel group 404 stored in the memory 704 starts to be read out. At this time, the control circuit 302 controls the selector 701 so that the transfer circuit 301 can transfer the pixel information from the memory 704 to the DSP 108, and starts to transfer the signal of the light shielded pixel group 404 to the DSP 108.

At time t1103, the A-signal and the (A+B)-signal of the third pixel group 402 stored in the memory 704 start to be transferred to the DSP 108.

At time t1104, upon completion of the transfers of the A-signal and the (A+B)-signal of the third pixel group 402, the correlation operation can be started from this time. At the same time, the (A+B)-signal of the second pixel group 403 stored in the memory 705 starts to be transferred. At this time, the control circuit 302 controls the selector 701 so that the transfer circuit 301 can transfer the pixel information from the memory 705 to the DSP 108.

At time t1105, the correlation operation is completed, and the lens 100 starts to be driven based on a result of the arithmetic operation. At time t1106, the driving of the lens 100 is completed, and the photoelectric conversion device becomes ready to start the next accumulation. At the same time, the accumulation for the next frame is started.

At time t1107, the transfer of the (A+B)-signal of the second pixel group 403, which has started to be transferred at time t1104, is completed. At the same time, the rearrangement circuit 304 rearranges the digital signals input to the DSP 108 from the order of the transfer to the order of spatial location in the pixel array 200. More specifically, the (A+B)-signal of the third pixel group 402 is stored into the RAM 109 after being repositioned into between the plurality of second pixel groups 403 according to the layout of the pixels 201.

Performing this operation described with reference to FIG. 12 eliminates the necessity of transferring the redundant signal a plurality of times in addition to allowing the signals to be read out from the memory in the order of storage. This allows the photoelectric conversion device to prevent the redundant transfer.

A moving body according to a fourth exemplary embodiment will be described with reference to FIGS. 13A and 13B.

Figure 13A:
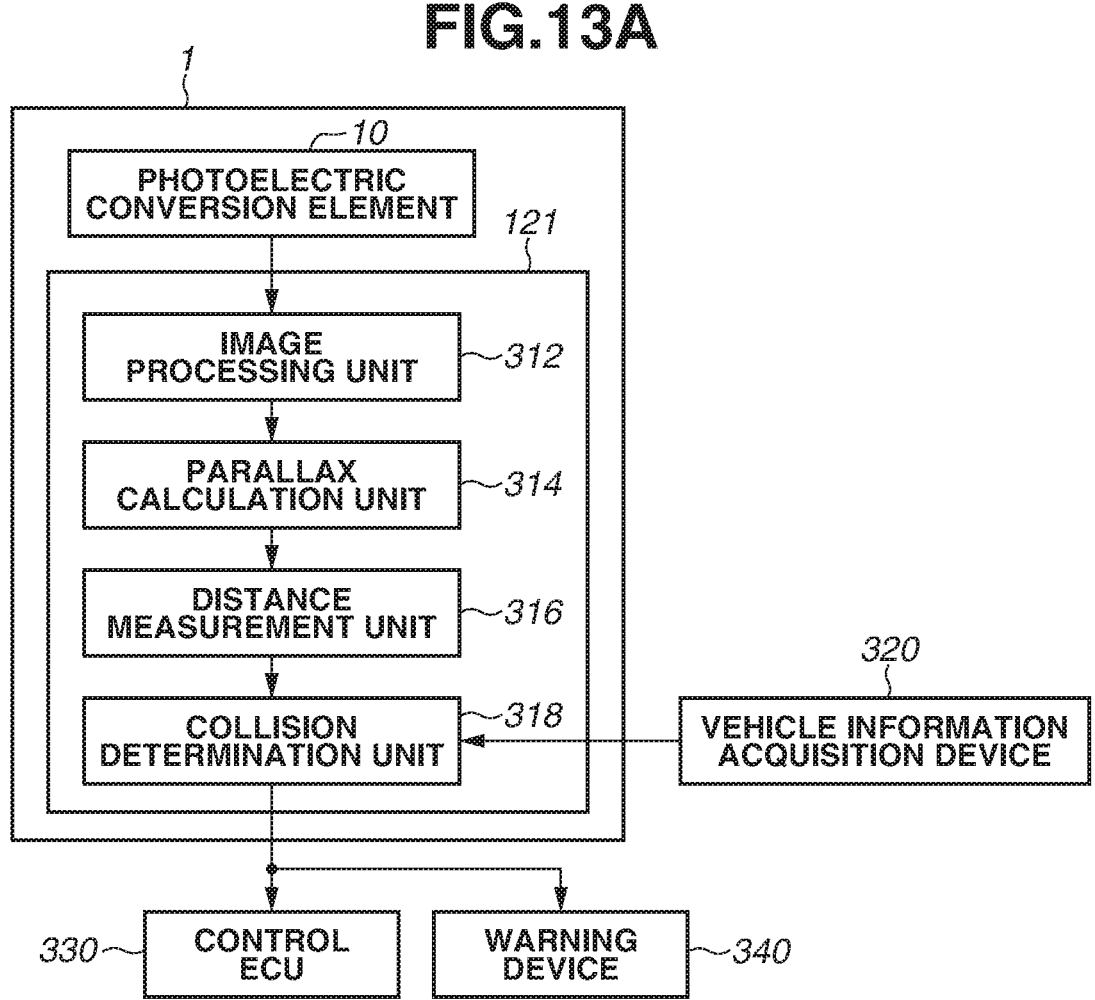
FIGS. 13A and 13B are schematic block diagrams illustrating a moving body according to a fourth exemplary embodiment.
Figure 13B:
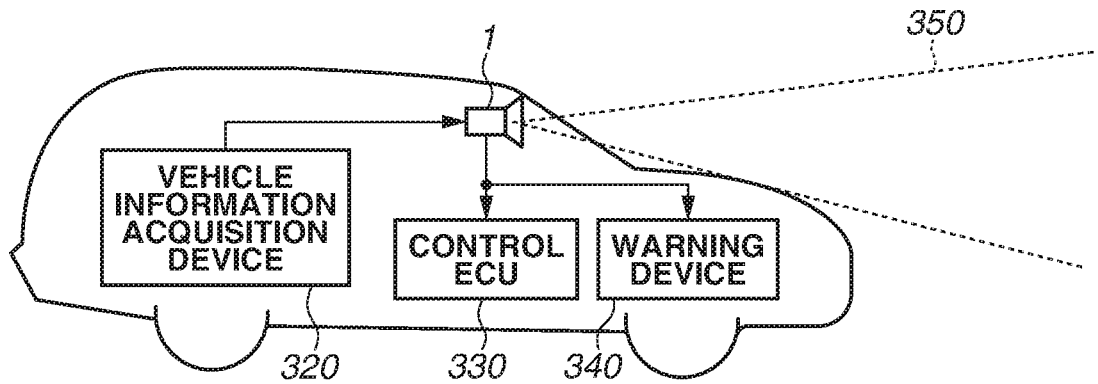

FIG. 13A illustrates one example of a photoelectric conversion device regarding an in-vehicle camera. A photoelectric conversion device 1 includes a photoelectric conversion element 10 and a signal processing device 121. The photoelectric conversion element 10 and the signal processing device 121 are the photoelectric conversion element and the signal processing device described in any of the above-described first to third exemplary embodiments. The photoelectric conversion device 1 includes an image processing unit 312, which performs image processing on a plurality of pieces of image data acquired by the photoelectric conversion element 10, and a parallax arithmetic operation unit 314, which calculates a parallax (e.g., a phase difference between parallax images) from the plurality of pieces of image data acquired by the photoelectric conversion element 10. The photoelectric conversion device 1 includes a distance measurement unit 316, which calculates a distance to a target based on the calculated parallax, and a collision determination unit 318, which determines whether there is a collision possibility based on the calculated distance. The parallax arithmetic operation unit 314 and the distance measurement unit 316 are one example of a distance information acquisition unit that acquires distance information to the target. In other words, the distance information refers to information regarding, for example, the parallax, a defocus amount, and the distance to the target. The collision determination unit 318 may determine the collision possibility using any of these pieces of distance information. The distance information acquisition unit may be achieved by hardware designed dedicatedly therefor or may be implemented by a software module. Alternatively, the distance information acquisition unit may be implemented by, for example, a field programmable gate array (FPGA), and an application specific integrated circuit (ASIC), or may be implemented by a combination of them.

The photoelectric conversion device 1 is connected to a vehicle information acquisition device 320, and can acquire vehicle information, such as a vehicle speed, a yaw rate, and a steering angle. An electronic control unit (ECU) 330, which is a control device that outputs a control signal for generating a braking force on the vehicle based on a result of the determination by the collision determination unit 318, is connected to the photoelectric conversion device 1. The photoelectric conversion device 1 is also connected to a warning device 340, which issues a warning to a driver based on the determination result by the collision determination unit 318. For example, when the collision possibility is high as the result of the determination by the collision determination unit 318, the ECU 330 controls the vehicle so as to avoid the collision or reduce damage by, for example, braking the vehicle, returning an accelerator, and reducing an engine output. The warning device 340 warns a user by, for example, sounding a warning such as a sound, displaying warning information on a screen of a car navigation system or the like, and/or vibrating a seat belt or a steering wheel.

In the present exemplary embodiment, an image around the vehicle, such as an image in front of or behind the vehicle, is captured by the photoelectric conversion device 1. FIG. 13B illustrates the photoelectric conversion device 1 when it captures the image in front of the vehicle (e.g., an imaging range 350). The vehicle information acquisition device 320 transmits an instruction to the photoelectric conversion device 1 or the photoelectric conversion element 10 so as to cause it to perform a predetermined operation. By such a configuration, the distance can be measured with higher accuracy.

In the above description, the photoelectric conversion device 1 has been described referring to the example that performs control so as to prevent the vehicle from colliding with another vehicle. However, the photoelectric conversion device 1 is also applicable to control for autonomously driving the vehicle so as to cause the vehicle to follow the other vehicle, control for autonomously driving the vehicle so as to prevent the vehicle from departing from a traffic lane, and the like. The photoelectric conversion device 1 is further applicable to not only the vehicle on which the photoelectric conversion device 1 is mounted, but also a moving body (e.g., a moving device) such as a ship, an airplane, or an industrial robot. In addition, the photoelectric conversion device 1 is applicable to not only the mobile body but also a device that widely recognizes an object, such as an intelligent transportation system (ITS).

The present disclosure can be modified in various manners without being limited to the above-described exemplary embodiments. The exemplary embodiments of the present disclosure also include an example in which a part of the configuration of any of the exemplary embodiments is added to another exemplary embodiment or replaces a part of the configuration of another exemplary embodiment.

Any of the above-described exemplary embodiments merely indicates an example of how to embody the present disclosure when implementing the present disclosure, and the technical scope of the present disclosure shall not be construed limitedly by them. In other words, the present disclosure can be implemented in various manners without departing from the technical idea thereof or the main features thereof.

The suitable order can be set as the order of inputting the signals of the plurality of pixels including the light shielded pixel to the arithmetic operation processing circuit.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-222799, filed Nov. 28, 2018, which is hereby incorporated by reference herein in its entirety.

What is claimed is:
1. A photoelectric conversion device comprising:
a pixel array including a plurality of pixels two-dimensionally laid out therein, the plurality of pixels each including a plurality of photoelectric conversion portions;
a memory configured to be input a signal output from the pixel array; and
an arithmetic operation circuit configured to be input the signal output from the memory and perform arithmetic operation processing using the signal,
wherein the plurality of pixels includes a first pixel, a second pixel, and a third pixel, the first pixel including the plurality of photoelectric conversion portions shielded from light, the second pixel and the third pixel each including the plurality of photoelectric conversion portions on which the light is incident,
wherein the pixel array outputs a first signal, a second signal, and a third signal in this order, the first signal being acquired based on electric charge generated in the plurality of photoelectric conversion portions included in the first pixel, the second signal being acquired based on electric charge generated in the plurality of photoelectric conversion portions included in the second pixel, and the third signal including at least one of a signal based on electric charge generated in one of the photoelectric conversion portions included in the third pixel and a signal based on electric charge generated in the other of the photoelectric conversion portions, wherein the first signal, the second signal, and the third signal are stored in the memory, and wherein the first signal, the second signal, and the third signal output from the memory are input to the arithmetic operation circuit in the order of the first signal, the third signal, and the second signal.

2. The photoelectric conversion device according to claim 1, wherein each of at least the second pixel and the third pixel among the plurality of pixels includes one micro lens, wherein the micro lens included in the second pixel is arranged so as to allow the light to be incident on the plurality of photoelectric conversion portions included in the second pixel after the light passes through the micro lens, and wherein the micro lens included in the third pixel is arranged so as to allow the light to be incident on the plurality of photoelectric conversion portions included in the third pixel after the light passes through the micro lens.

3. The photoelectric conversion device according to claim 1, wherein the signal based on the plurality of photoelectric conversion portions included in the first pixel is a signal acquired as a sum of the signal of the one of the photoelectric conversion portions and the signal of the other of the photoelectric conversion portions.

4. The photoelectric conversion device according to claim 1, further comprising a control circuit, wherein the control circuit changes the order of the signals output from the pixel array before the signals are input to the memory.

5. The photoelectric conversion device according to claim 1, further comprising a control circuit, wherein the control circuit changes an order of the signals output from the memory before the signals are input to the arithmetic operation processing circuit.

6. The photoelectric conversion device according to claim 1, wherein the memory is a random access memory (RAM).

7. The photoelectric conversion device according to claim 6, wherein the memory is a dynamic random access memory (DRAM).

8. The photoelectric conversion device according to claim 1, wherein an order of the signals output from the memory and an order of the signals output from the arithmetic operation processing circuit are the same.

9. The photoelectric conversion device according to claim 1, further comprising a vertical scanning circuit configured to control the signal output from the pixel array, wherein the vertical scanning circuit selects pixel rows in an order of a pixel row containing the first pixel, a pixel row containing the second pixel, and a pixel row containing the third pixel so that the pixel array outputs the first signal, the second signal, and the third signal in this order.

10. The photoelectric conversion device according to claim 1, wherein a plurality of the first pixels is arranged in a row direction and a column direction, wherein an order of the first signal acquired from the first pixel arranged in the column direction is changed, and wherein an order of the first signal acquired from the first pixel arranged in the row direction is not changed.

11. The photoelectric conversion device according to claim 1, wherein the pixel array is disposed on a first chip, wherein the memory is disposed on a second chip, the second chip being a different chip from the first chip, and wherein the first chip and the second chip are stacked.

12. The photoelectric conversion device according to claim 1, wherein the pixel array is disposed on a first chip, wherein the arithmetic operation processing circuit is disposed on a second chip, the second chip being a different chip from the first chip, and wherein the first chip and the second chip are stacked.

13. A moving body comprising:

the photoelectric conversion device according to claim 1;

a moving device;

a processing device configured to acquire information from the signal output from the photoelectric conversion device; and a control device configured to control the moving device based on the information.

14. A photoelectric conversion device comprising:

a pixel array including a first pixel, a second pixel, and a third pixel, the first pixel including a plurality of photoelectric conversion portions shielded from light and being configured to output a black reference signal generated in the plurality of photoelectric conversion portions, the second pixel including a plurality of photoelectric conversion portions and being configured to generate a signal for an image, the third pixel including a plurality of photoelectric conversion portions and being configured to generate the signal for the image and a signal for focus detection;

a memory configured to input a signal output from the pixel array; and an arithmetic processing circuit configured to be input the signal output from the memory and perform arithmetic operation processing using the signal, wherein the pixel array outputs a first signal, a second signal, and a third signal in this order, the first signal corresponding to the black reference signal output from the first pixel, the second signal corresponding to the signal for the image that is output from the second pixel, and the third signal including the signal for the image and the signal for the focus detection that are output from the third pixel, wherein the first signal, the second signal, and the third signal are stored in the memory, and wherein the first signal, the second signal, and the third signal output from the memory are input to the arithmetic operation processing circuit in the order of the first signal, the third signal, and the second signal.

15. A signal processing device, the signal processing device configured to be input a signal from a pixel array including a plurality of pixels, the signal processing device comprising:

a memory configured to receive the input of the signal output from the pixel array; and an arithmetic operation processing circuit configured to receive an input of the signal output from the memory and perform arithmetic operation processing using the signal, wherein the plurality of pixels included in the pixel array includes a first pixel, a second pixel, and a third pixel, the first pixel including a plurality of photoelectric conversion portions shielded from light, the second pixel and the third pixel each including a plurality of photoelectric conversion portions on which the light is incident, wherein a first signal, a second signal, and a third signal are output from the pixel array in this order, the first signal being acquired based on electric charge generated in the plurality of photoelectric conversion portions included in the first pixel, the second signal being acquired based on electric charge generated in the plurality of photoelectric conversion portions included in the second pixel, and the third signal including at least one of a signal based on electric charge generated in one of the photoelectric conversion portions included in the third pixel and a signal based on electric charge generated in the other of the photoelectric conversion portions, wherein the first signal, the second signal, and the third signal are stored in the memory, and wherein the first signal, the second signal, and the third signal output from the memory are input to the arithmetic operation processing circuit in an order of the first signal, the third signal, and the second signal.

16. The signal processing device according to claim 15, further comprising a control circuit,
wherein the control circuit changes the order of the signals output from the pixel array before the signals are input to the memory.

17. The signal processing device according to claim 15, further comprising a control circuit,
wherein the control circuit changes an order of the signals output from the memory before the signals are input to the arithmetic operation processing circuit.

18. The signal processing device according to claim 15, wherein the memory is a random access memory (RAM).

19. The signal processing device according to claim 15, wherein an order of the signals output from the memory and an order of the signals output from the arithmetic operation processing circuit are the same.

20. A signal processing device, the signal processing device configured to be input a signal from a pixel array, the pixel array including a first pixel, a second pixel, and a third pixel, the first pixel including a plurality of photoelectric conversion portions shielded from light and being configured to output a black reference signal generated in the plurality of photoelectric conversion portions, the second pixel including a plurality of photoelectric conversion portions and being configured to be used to generate a signal for an image, the third pixel including a plurality of photoelectric conversion portions and being configured to be used to generate the signal for the image and a signal for focus detection, the signal processing device comprising:
a memory configured to be input the signal output from the pixel array; and
an arithmetic operation processing circuit configured to be input a digital signal output from the memory and perform arithmetic operation processing, wherein the pixel array outputs a first signal, a second signal, and a third signal in this order, the first signal corresponding to the black reference signal output from the first pixel, the second signal corresponding to the signal for the image that is output from the second pixel, and the third signal including the signal for the image and the signal for the focus detection that is output from the third pixel, wherein the first signal, the second signal, and the third signal are stored in the memory, and wherein the first signal, the second signal, and the third signal output from the memory are input to the arithmetic operation processing circuit in the order of the first signal, the third signal, and the second signal.

* * * * *